US012441108B2

(12) United States Patent
Kitaoka et al.

(10) Patent No.: US 12,441,108 B2
(45) Date of Patent: Oct. 14, 2025

(54) LIQUID DISCHARGE HEAD, LIQUID DISCHARGE DEVICE, LIQUID DISCHARGE APPARATUS, METHOD FOR MANUFACTURING LIQUID DISCHARGE HEAD

(71) Applicants: Naoko Kitaoka, Kanagawa (JP); Makoto Tanaka, Tokyo (JP)

(72) Inventors: Naoko Kitaoka, Kanagawa (JP); Makoto Tanaka, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 193 days.

(21) Appl. No.: 18/116,316

(22) Filed: Mar. 2, 2023

(65) Prior Publication Data

US 2023/0294402 A1 Sep. 21, 2023

(30) Foreign Application Priority Data

Mar. 17, 2022 (JP) ................................ 2022-043180
Nov. 30, 2022 (JP) ................................ 2022-192148

(51) Int. Cl.
*B41J 2/14* (2006.01)
*B41J 2/16* (2006.01)

(52) U.S. Cl.
CPC ........... *B41J 2/14233* (2013.01); *B41J 2/161* (2013.01); *B41J 2/1626* (2013.01)

(58) Field of Classification Search
CPC .... B41J 2/14201; B41J 2/14233; B41J 2/161; B41J 2/1626; B41J 2002/1437;
(Continued)

(56) References Cited

U.S. PATENT DOCUMENTS 6,341,847 B1 1/2002 Ohta et al.
6,354,697 B1 3/2002 Tanaka et al.
(Continued)

FOREIGN PATENT DOCUMENTS

JP 2014-046580 3/2014
JP 2019-191184 10/2019
(Continued)

OTHER PUBLICATIONS

U.S. Appl. No. 17/959,301, filed Oct. 4, 2022, Toshiaki Masuda, et al.

*Primary Examiner* — Anh T Vo
(74) *Attorney, Agent, or Firm* — XSENSUS LLP

(57) ABSTRACT

A liquid discharge head includes a nozzle from which a liquid is to be discharged; a pressure chamber communicating with the nozzle; a substrate defining a side wall the pressure chamber; a diaphragm having a surface on the substrate, the diaphragm defining a part of a wall of the pressure chamber and a part of the nozzle; and a piezoelectric element on another surface of the diaphragm opposite to the surface of the diaphragm on the substrate, the piezoelectric element including: a piezoelectric portion configured to vibrate; and a pair of electrodes sandwiching the piezoelectric portion between the pair of electrodes, and an area of at least one of the pair of electrodes of the piezoelectric element is larger than an area of the pressure chamber in a plane of the diaphragm.

18 Claims, 22 Drawing Sheets

(58) Field of Classification Search
CPC ....... B41J 2002/14491; H10N 30/2047; H10N 30/883; H01N 30/2047
See application file for complete search history.

(56) References Cited

U.S. PATENT DOCUMENTS

| | | | |
|---|---|---|---|
| 6,367,914 B1 | 4/2002 | Ohtaka et al. | |
| 6,485,126 B1 | 11/2002 | Kato et al. | |
| 6,494,567 B2 * | 12/2002 | Murai | H10N 30/2047 347/71 |
| 8,459,782 B2 * | 6/2013 | Asaoka | B41J 2/1642 347/71 |
| 2001/0055046 A1 | 12/2001 | Tanaka | |
| 2003/0227519 A1 * | 12/2003 | Ikeda | B41J 2/04588 347/68 |
| 2005/0264617 A1 | 12/2005 | Nishimura et al. | |
| 2008/0117262 A1 | 5/2008 | Mori et al. | |
| 2008/0291254 A1 * | 11/2008 | Kyoso | B41J 2/155 347/92 |
| 2008/0309734 A1 | 12/2008 | Nishimura et al. | |
| 2010/0182366 A1 | 7/2010 | Takagi et al. | |
| 2011/0063351 A1 | 3/2011 | Kitaoka | |
| 2012/0236083 A1 * | 9/2012 | Mizukami | B41J 2/1612 347/70 |
| 2013/0070010 A1 | 3/2013 | Tobita et al. | |
| 2014/0160193 A1 | 6/2014 | Iwata et al. | |
| 2014/0225949 A1 | 8/2014 | Kitaoka | |
| 2014/0253618 A1 | 9/2014 | Masuda et al. | |
| 2014/0327714 A1 | 11/2014 | Iwata et al. | |
| 2015/0375504 A1 | 12/2015 | Kitaoka et al. | |
| 2016/0075132 A1 | 3/2016 | Kitaoka et al. | |
| 2016/0144620 A1 | 5/2016 | Masuda et al. | |
| 2016/0185110 A1 | 6/2016 | Masuda et al. | |
| 2016/0355011 A1 | 12/2016 | Masuda et al. | |
| 2022/0032622 A1 | 2/2022 | Kitaoka | |
| 2023/0021821 A1 | 1/2023 | Kuroda et al. | |

FOREIGN PATENT DOCUMENTS

| | | |
|---|---|---|
| JP | 2021-112907 | 8/2021 |
| WO | WO 2018/054917 A1 | 3/2018 |

* cited by examiner

COMPARATIVE EXAMPLE

COMPARATIVE EXAMPLE

LIQUID DISCHARGE HEAD, LIQUID DISCHARGE DEVICE, LIQUID DISCHARGE APPARATUS, METHOD FOR MANUFACTURING LIQUID DISCHARGE HEAD

CROSS-REFERENCE TO RELATED APPLICATIONS

This patent application is based on and claims priority pursuant to 35 U.S.C. § 119(a) to Japanese Patent Application No. 2022-043180 filed on Mar. 17, 2022, and Japanese Patent Application No. 2022-192148, filed on Nov. 30, 2022, in the Japan Patent Office, the entire disclosure of which is hereby incorporated by reference herein.

BACKGROUND

Technical Field

The present embodiment relates to a liquid discharge head, a liquid discharge device, a liquid discharge apparatus, and a method for manufacturing a liquid discharge head.

Related Art

A liquid discharge head includes a substrate having a pressure chamber communicating with a nozzle; a diaphragm formed as a layer on the substrate on a side where the substrate faces the nozzle, the diaphragm forming part of a wall surface of the pressure chamber; and a piezoelectric element mounted on a surface of the diaphragm opposite to a surface forming the wall surface of the pressure chamber, the piezoelectric element including a piezoelectric portion sandwiched between a pair of electrodes.

Some liquid discharge heads have a piezoelectric element including a pair of electrodes each having an outer diameter smaller than an inner diameter of a pressure chamber.

SUMMARY

In an aspect of the present disclosure, a liquid discharge head includes a nozzle from which a liquid is to be discharged; a pressure chamber communicating with the nozzle; a substrate defining a side wall the pressure chamber; a diaphragm having a surface on the substrate, the diaphragm defining a part of a wall of the pressure chamber and a part of the nozzle; and a piezoelectric element on another surface of the diaphragm opposite to the surface of the diaphragm on the substrate, the piezoelectric element including: a piezoelectric portion configured to vibrate; and a pair of electrodes sandwiching the piezoelectric portion between the pair of electrodes, and an area of at least one of the pair of electrodes of the piezoelectric element is larger than an area of the pressure chamber in a plane of the diaphragm.

In another aspect of the present disclosure, a method for manufacturing a liquid discharge head, the method includes forming a diaphragm on a substrate, one surface of the diaphragm is on the substrate; forming a piezoelectric element on another surface of the diaphragm, the piezoelectric element including a pair of electrodes and a piezoelectric portion between the pair of electrodes; forming wires to be electrically connected to the piezoelectric element; and forming a pressure chamber in the substrate while electrically connecting one of the pair of electrodes to a ground.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
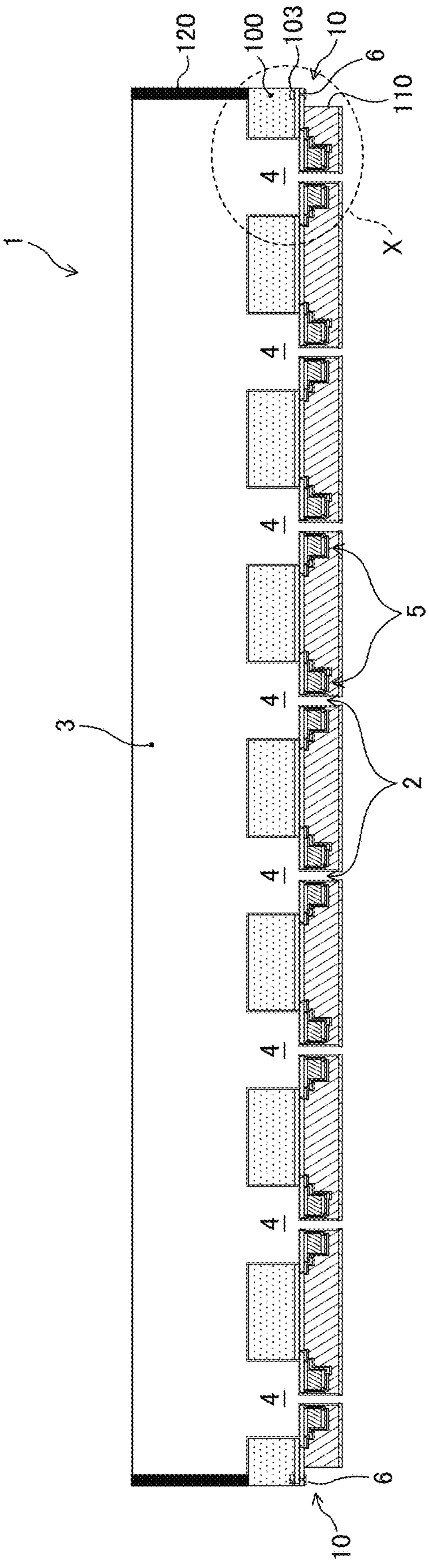
FIG. 1 is a schematic cross-sectional view of a nozzle vibration type liquid discharge head in the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Hereinafter, a description will be given of an embodiment of a liquid discharge head to be provided in a liquid discharge apparatus.

The present embodiment is not limited to an embodiment to be described below, but may be another embodiment, and changes such as additions, modifications, and deletions can be made within the scope that can be conceived by those skilled in the art. Any aspect is included in the scope of the present embodiment as long as the function and effect of the present embodiment are achieved.

The liquid discharge head in the present embodiment is a nozzle vibration type liquid discharge head that changes pressure in a pressure chamber by means of an actuator including a nozzle, to discharge liquid in the pressure chamber from the nozzle. The nozzle vibration system is characterized in that droplets can be splashed with a smaller force than a general unimorph piezoelectric head (liquid discharge head that vibrates a surface of a pressure chamber to discharge liquid, the surface facing a surface having a communication port communicating with a nozzle). Thus, the nozzle vibration system can achieve power saving and high efficiency of an actuator. In addition, the volume of a pressure chamber can be reduced in the nozzle vibration system. Thus, the nozzle vibration system can also achieve downsizing of a head, densification of nozzles, and the like.

Figure 2:
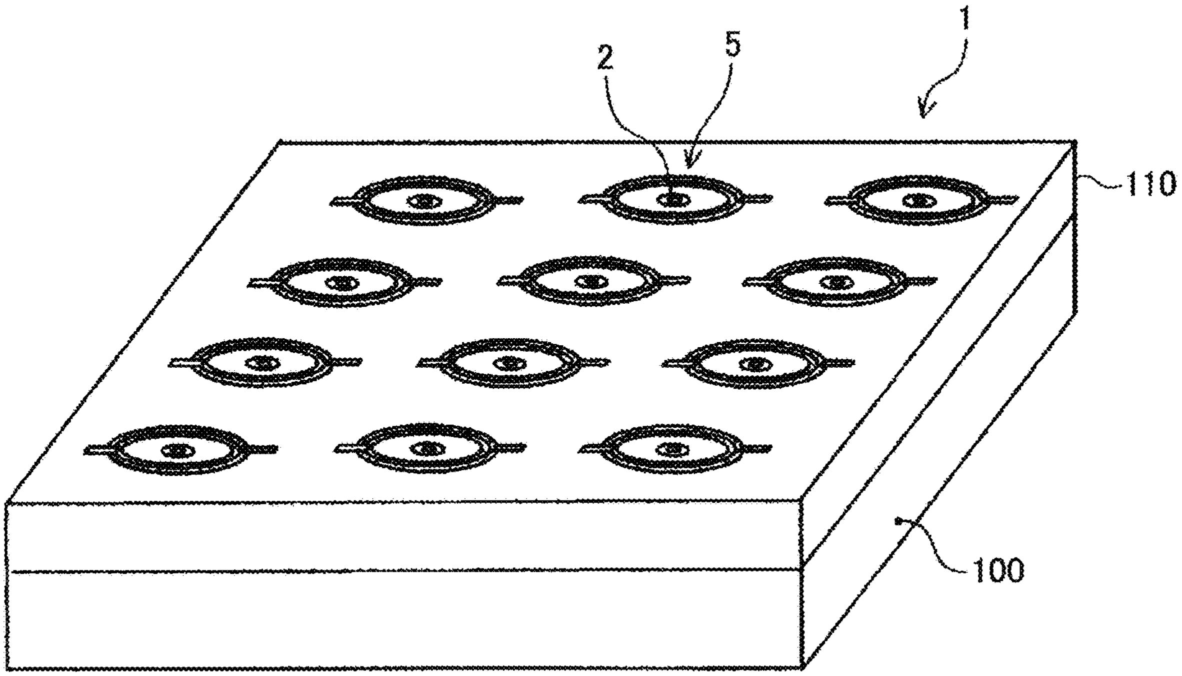
FIG. 2 is a schematic perspective view of the liquid discharge head.

FIG. 1 is a schematic cross-sectional view of a nozzle vibration type liquid discharge head in the present embodiment. FIG. 2 is a schematic perspective view of the liquid discharge head.

A liquid discharge head 1 includes an actuator 110, a diaphragm 103, a channel substrate 100, a frame member 120, and the like.

The actuator 110 is formed as a thin film, and includes a plurality of nozzles 2 and piezoelectric elements 5. The plurality of nozzles 2 discharges liquid. The piezoelectric elements 5 function as annular electromechanical transducer elements disposed around the nozzles 2. The channel substrate 100 has a plurality of pressure chambers 4 (also referred to as individual chambers) each communicating with corresponding one of the plurality of nozzles 2. The frame member 120 has a common chamber 3 communicating with the plurality of pressure chambers 4.

An electrical connection pad 6 for connecting to an electrical component such as an external power supply is provided at each end of the liquid discharge head 1.

Figure 3:
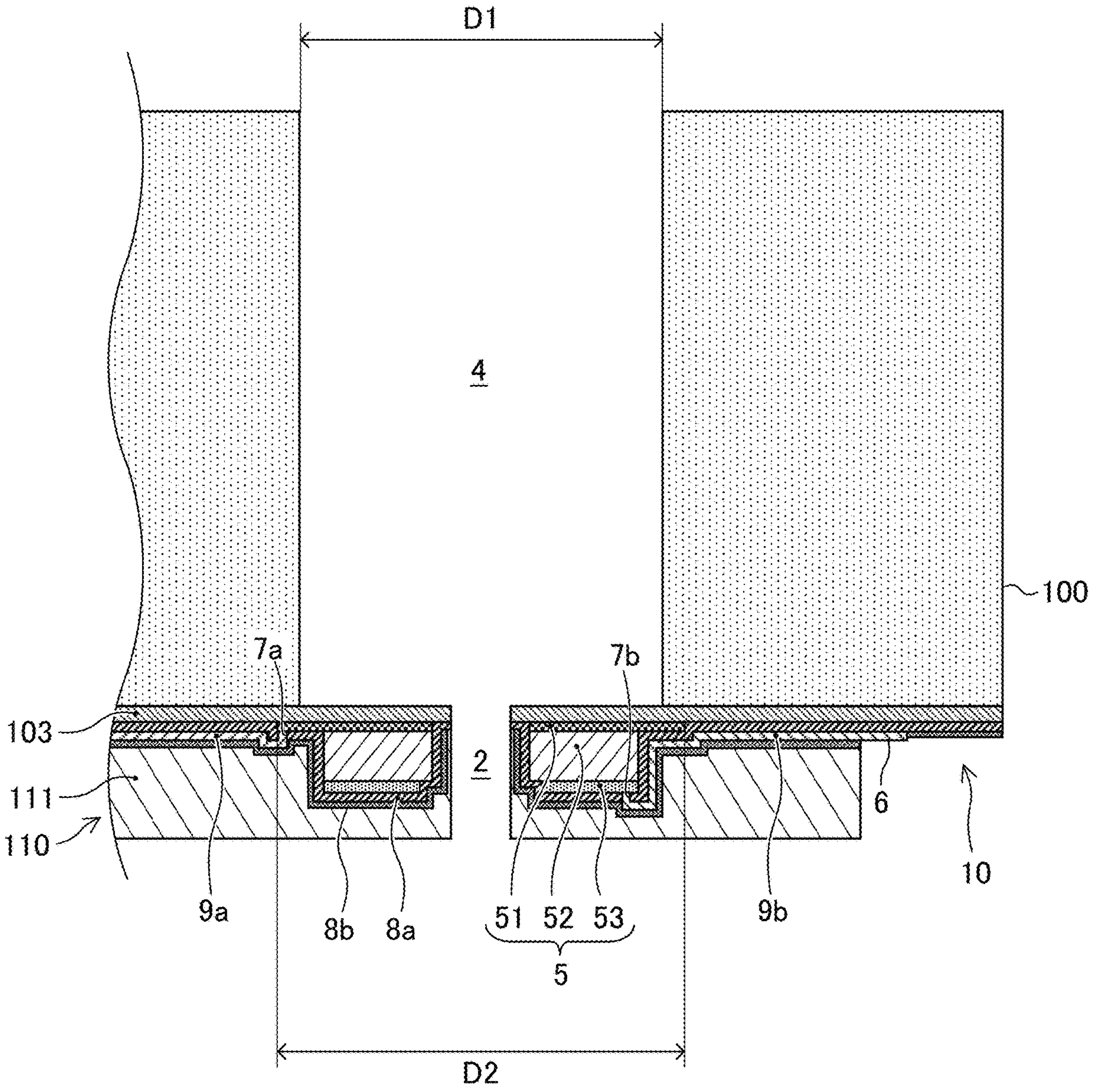
FIG. 3 is an enlarged cross-sectional view of a portion X in FIG. 1.

FIG. 3 is an enlarged cross-sectional view of a portion X in FIG. 1.

The channel substrate 100 is a silicon-on-insulator (SOI) substrate or Si substrate, and has the plurality of pressure chambers 4. An SOI substrate may be used as the channel substrate 100 such that a drive circuit, a wiring portion, and the like may be provided in the substrate. The diaphragm 103 is formed on the channel substrate 100, and serves as a lower surface which is part of a wall surface of the pressure chamber 4.

The actuator 110 has a nozzle forming portion 111 (nozzle forming film) that covers the piezoelectric elements 5. The plurality of nozzles 2 is formed in the nozzle forming portion 111. A liquid-repellent film may be formed on a nozzle surface of the nozzle forming portion 111. Formation of the liquid-repellent film on the nozzle surface makes it possible to prevent liquid from adhering to the nozzle surface. Thus, liquid discharged from the nozzle 2 can be prevented from being affected by liquid adhering to the nozzle surface. In a case where solvent for the liquid is a water-based solvent, perfluorodecyltrichlorosilane or perfluorooctyltrichlorosilane can be used as material of the liquid-repellent film.

The piezoelectric element 5 of the actuator 110 includes a first electrode 51 (also referred to as a lower electrode), a piezoelectric film 52, and a second electrode 53 (also referred to as an upper electrode). The piezoelectric element 5 is covered with a first insulating film 8*a*.

The first insulating film 8*a* is formed in such a way as to cover the piezoelectric element 5 and the diaphragm 103. A first contact 7*a* and a second contact 7*b* are formed in the first insulating film 8*a*. The first contact 7*a* is a hole-shaped contact for electrically connecting to the first electrode 51. The second contact 7*b* is a hole-shaped contact for electrically connecting to the second electrode 53. A first lead-out wire 9*a* and a second lead-out wire 9*b* are each formed as a layer on the first insulating film 8*a*. The first lead-out wire 9*a* serves as a wire electrically connected to the first electrode 51 at the first contact 7*a*. The second lead-out wire 9*b* is electrically connected to the second electrode 53 at the second contact 7*b*. The first lead-out wire 9*a* may also be called as a "first wire", and the second lead-out wire 9*b* may also be called as a "second wire".

The first lead-out wire 9*a* extends to a pad opening 10 on one end (left end in FIG. 1) of the liquid discharge head 1. A portion of the first lead-out wire 9*a*, corresponding to the pad opening 10, serves as the electrical connection pad 6 for connecting to an electrical component such as an external power supply. The second lead-out wire 9*b* extends to a pad opening 10 on another end (right end in FIG. 1) of the liquid discharge head 1. A portion of the second lead-out wire 9*b*, corresponding to the pad opening 10, serves as the electrical connection pad 6 for connecting to an electrical component such as an external power supply.

A second insulating film 8*b* is provided which covers the first lead-out wire 9*a* and the second lead-out wire 9*b*. The second insulating film 8*b* also covers the piezoelectric element 5. The second insulating film 8*b* has a function of preventing moisture having entered the nozzle forming portion 111 made of resin from entering the piezoelectric element 5, to protect the piezoelectric element 5.

In the present embodiment, an outer diameter D2 of the first electrode 51 of the piezoelectric element 5 is larger than an inner diameter D1 of the pressure chamber 4. The outer diameter of the piezoelectric film 52 is smaller than the inner diameter D1 of the pressure chamber 4. The outer diameter of the second electrode 53 is equal to the outer diameter of the piezoelectric film 52.

In a case where inner peripheral surfaces of the pressure chamber and the nozzle are eroded by the liquid, a protective film resistant to the liquid may be provided on the inner peripheral surfaces of the pressure chamber and the nozzle. Examples of the protective film include metallic oxide that achieves a passive state. Examples of the metal of the metallic oxide include tantalum (Ta), niobium (Nb), titanium (Ti), zirconium (Zr), hafnium (Hr), and tungsten (W) that can be flexibly applied in terms of oxidation numbers. In particular, it is desirable to use Zr or Hr having a valence similar to the valence of $SiO_2$, or use Ta having a valence close to the valence of Zr and Hr.

In addition, it is desirable for the protective film to be lyophilic. In a case where a lyophilic protective film is used, liquid easily spreads on the inner peripheral surfaces of the pressure chamber 4 and the nozzle 2 to wet the inner peripheral surfaces of the pressure chamber 4 and the nozzle 2 at the time of filling the pressure chamber 4 with the liquid. As a result, the filling property of liquid can be improved. In a case where solvent for the liquid is a water-based solvent, it is possible to use a mixture in which a metallic oxide is mixed with silicon dioxide ($SiO_2$) at the molecular level. Replacing O of $SiO_2$ on the surface of the protective film with a hydrophilic OH group enables the protective film to have hydrophilicity.

Figure 4:
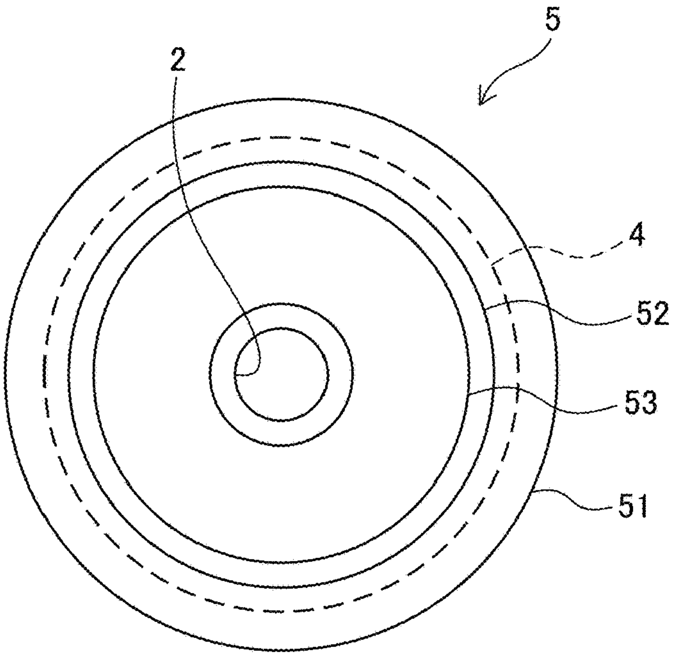
FIG. 4 is a diagram illustrating a configuration of an example of the liquid discharge head in which only a first electrode has an outer diameter larger than an inner diameter of a pressure chamber.

FIG. 4 is a diagram illustrating a configuration of an example of the liquid discharge head of the present embodiment in which only the first electrode has an outer diameter larger than the inner diameter of the pressure chamber.

In the present embodiment, the outer diameter of the first electrode 51 of the piezoelectric element 5 is larger than the inner diameter of the pressure chamber 4. Thus, the first electrode 51 is larger than the pressure chamber 4 when viewed from a liquid discharge direction as illustrated in FIG. 4.

In the nozzle vibration type liquid discharge head in which the piezoelectric element 5 is provided on the nozzle side, it is desirable to form the pressure chamber 4 having a high cross-sectional aspect ratio (narrow and deep pressure chamber) so as to achieve excellent discharge characteristics with high liquid discharge efficiency and reduced crosstalk. Therefore, in the present embodiment, the pressure chamber 4 is formed by deep reactive ion etching (DRIE), as will be described below. In DRIE, ions are accelerated by an electric field, and are caused to collide with an etching target to etch the etching target. However, in this DRIE process, an etching surface etched by ions is charged. There is a possibility that the charging of the etching surface may cause disturbance in the electric field to bend released ions, so that so-called notching, bowing, or the like may occur. In the notching, a bottom surface-side end of a side wall surface of a recess formed as a result of being etched by ions is excessively etched. In the bowing, the side wall surface becomes bowed.

Figure 5:
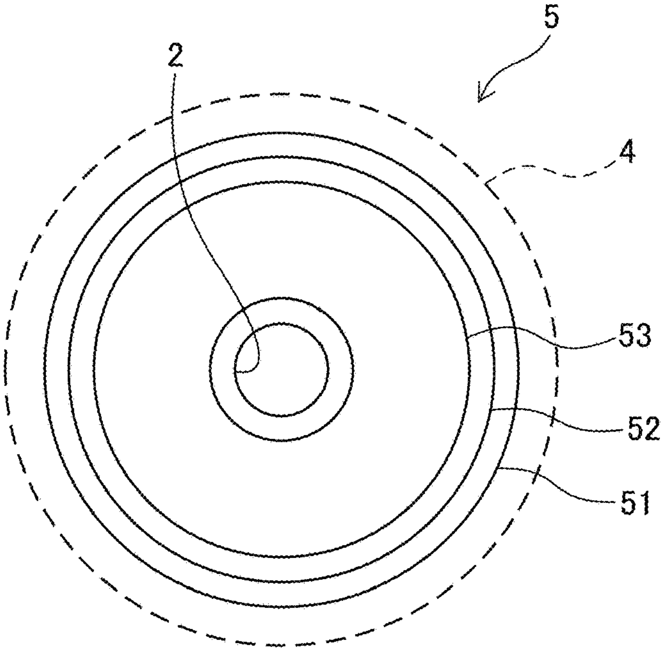
FIG. 5 is a diagram illustrating a configuration in which an outer diameter of a piezoelectric element is smaller than the inner diameter of the pressure chamber.

Therefore, in the present embodiment, while the pressure chamber 4 is being formed, either one of a pair of the electrodes of the piezoelectric element 5 is electrically connected to the ground so as to prevent the charge-up of an etching surface of the channel substrate 100, as will be described below. However, when the outer diameters of the first electrode 51 and the second electrode 53 of the piezoelectric element 5 are smaller than the inner diameter of the pressure chamber 4 as illustrated in FIG. 5, the charge-up of the etching surface of the channel substrate 100 may not be sufficiently prevented in some cases.

In contrast, in the present embodiment, the outer diameter of the first electrode 51 of the piezoelectric element 5 is larger than the inner diameter of the pressure chamber 4, as illustrated in FIG. 4. As a result, when viewed from the liquid discharge direction, that is, a direction in which liquid is discharged from the liquid discharge head, the first electrode 51 is larger than the pressure chamber 4. Therefore, the first electrode 51 can be made larger than a range in which ions collide with the channel substrate 100 when the pressure chamber 4 is formed by DRIE. Therefore, as a result of electrically connecting the first electrode 51 to the ground at the time of forming the pressure chamber 4, charge on the etching surface of the channel substrate 100 can more easily escape to the electrode than in the configuration illustrated in FIG. 5. As a result, the charge-up of the etching surface of the channel substrate 100 can be prevented, and the pressure chamber 4 can be formed more accurately.

Figure 6:
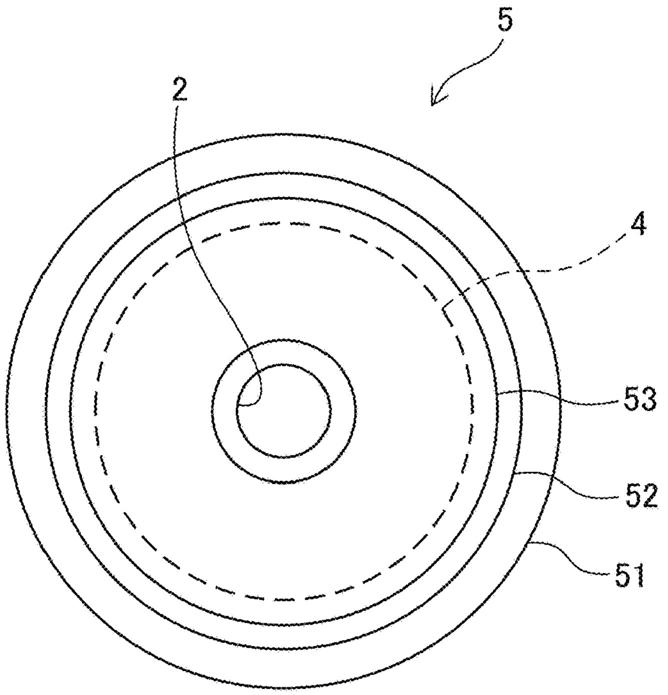
FIG. 6 is a diagram illustrating a configuration of an example of the liquid discharge head in which the outer diameter of the piezoelectric element is larger than the inner diameter of the pressure chamber.
Figure 7:
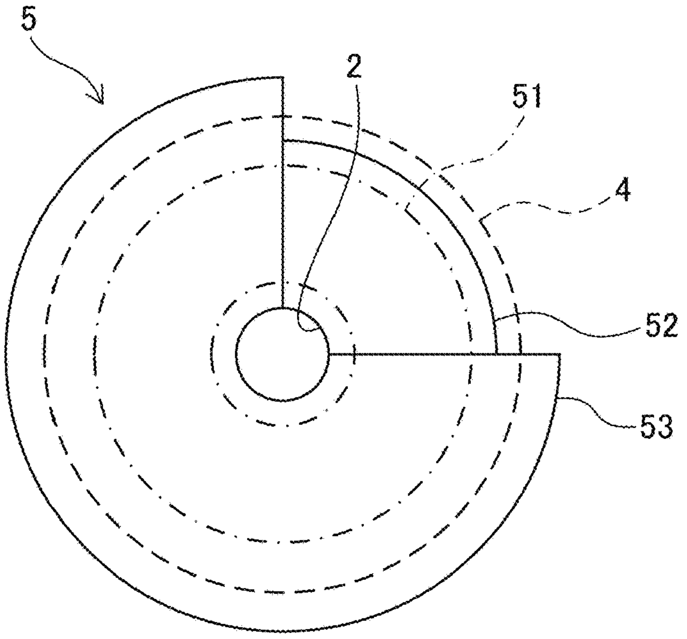
FIG. 7 is a diagram illustrating a configuration of an example of the liquid discharge head in which only a second electrode has an outer diameter larger than the inner diameter of the pressure chamber.

In the present embodiment, the first electrode 51 is larger than the inner diameter of the pressure chamber 4. Meanwhile, as illustrated in FIG. 6, the first electrode 51, the piezoelectric film 52, and the second electrode 53 may be larger than the inner diameter of the pressure chamber 4, and the piezoelectric element 5 itself may be larger than the inner diameter of the pressure chamber 4. Alternatively, as illustrated in FIG. 7, it is possible to adopt a configuration in which only the second electrode 53 is larger than the inner diameter of the pressure chamber 4. Note that ¼ of the second electrode 53 has been cut out for easy understanding of the configuration of the piezoelectric element 5 in FIG. 7, but actually, the second electrode 53 covers entirely the first electrode 51 and the piezoelectric film 52.

In the configuration illustrated in FIG. 6, the first electrode 51 or the second electrode 53 is electrically connected to the ground while the pressure chamber 4 is being formed. As a result, it is possible to satisfactorily prevent the charge-up of the etching surface of the channel substrate 100. Meanwhile, in the configuration illustrated in FIG. 7, the second electrode 53 is electrically connected to the ground while the pressure chamber 4 is being formed. As a result, it is possible to satisfactorily prevent the charge-up of the etching surface of the channel substrate 100.

As illustrated in FIGS. 4 and 7, the outer diameter of the piezoelectric film 52 is preferably smaller than the inner diameter of the pressure chamber 4. As a result of making the outer diameter of the piezoelectric film 52 smaller than the inner diameter of the pressure chamber 4, vibration efficiency and discharge efficiency can be significantly enhanced as compared with the configuration in which the piezoelectric -film 52 is larger than the inner diameter of the pressure chamber 4 as illustrated in FIG. 6. Setting the outer diameter of the piezoelectric film 52 to about 80% of the inner diameter of the pressure chamber 4 allows vibration efficiency and discharge efficiency to be maximized.

In a general unimorph piezoelectric head (liquid discharge head that vibrates a surface of a pressure chamber to discharge liquid, the surface facing a surface having a communication port communicating with a nozzle), the piezoelectric element 5 and a wiring pattern are placed such that the piezoelectric element 5 and the wiring pattern are out of contact with ink. Therefore, moisture proofness is not needed so much in the general unimorph piezoelectric head (it is not needed to entirely cover the piezoelectric element 5 with a moisture-proof protective film). However, in the nozzle vibration system, it is desirable to consider moisture proofness. Therefore, it is common to entirely cover the piezoelectric element 5 with a moisture-proof protective film.

As illustrated in FIG. 7, making the outer diameter of the second electrode 53 larger than the first electrode 51 and the piezoelectric film 52 allows the piezoelectric film 52 to be covered with the second electrode 53. As a result, the second electrode 53 can protect the piezoelectric film 52 from moisture entering the nozzle forming portion 111. As described above, the second electrode 53 can function as a protective film (moisture-proof film) that protects the piezoelectric film 52 from moisture. Therefore, a moisture-proof protective film is not needed. This makes it possible to make the actuator 110 thinner than in a case where a moisture-proof protective film is formed. As a result, the diaphragm 103 is easily deformed, so that vibration efficiency can be enhanced.

The first contact 7*a* connecting the first electrode 51 and the first lead-out wire 9*a* is provided near an outer end of the first electrode 51. The second contact 7*b* connecting the second electrode 53 and the second lead-out wire 9*b* is provided near an outer end of the second electrode 53.

Figure 8:
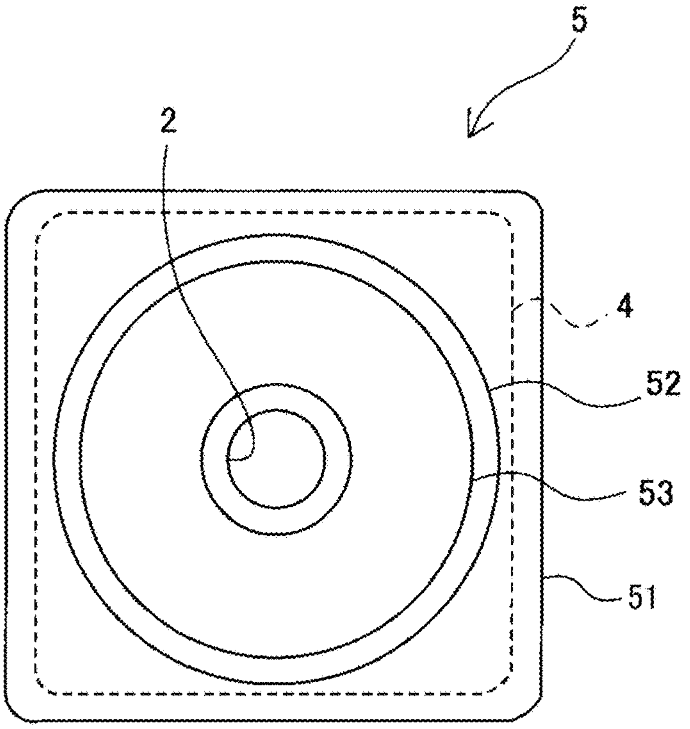
FIG. 8 is a diagram illustrating a configuration in which the first electrode is larger than the pressure chamber in the liquid discharge head, the pressure chamber having a quadrilateral shape when viewed from a liquid discharge direction.
Figure 9:
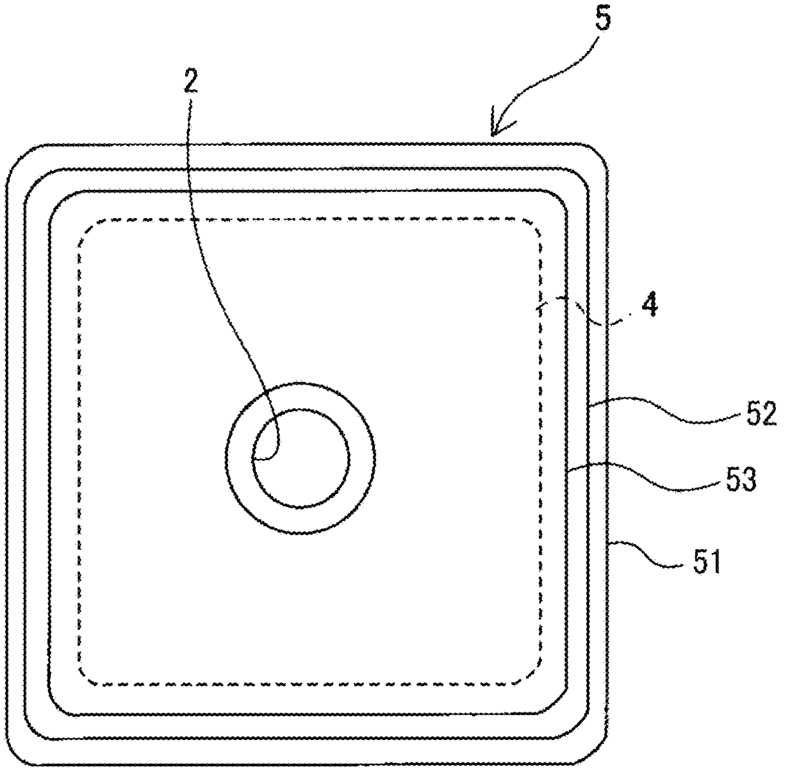
FIG. 9 is a diagram illustrating a configuration in which the piezoelectric element is larger than the pressure chamber in the liquid discharge head, the pressure chamber having a quadrilateral shape when viewed from the liquid discharge direction.
Figure 10:
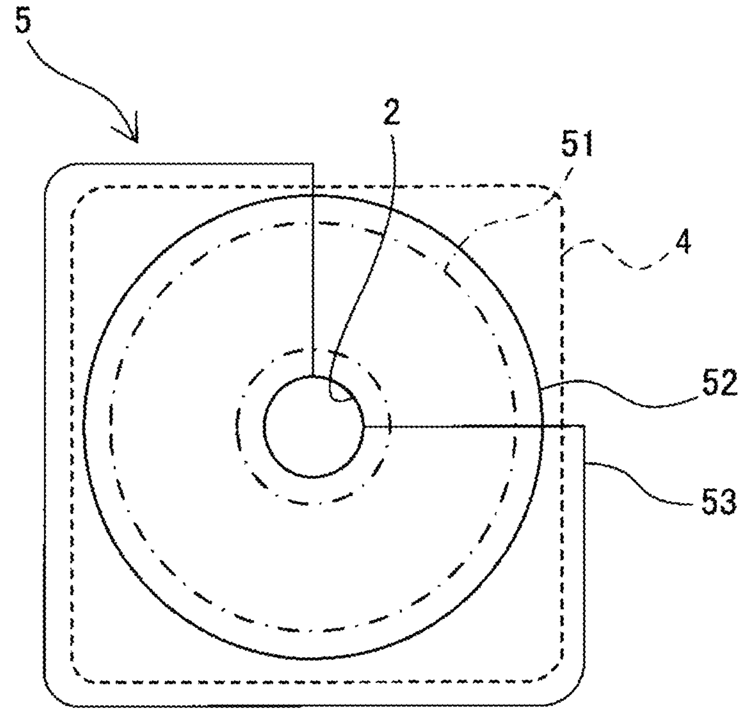
FIG. 10 is a diagram illustrating a configuration in which the second electrode is larger than the pressure chamber in the liquid discharge head, the pressure chamber having a quadrilateral shape when viewed from the liquid discharge direction.

FIGS. 8, 9, and 10 illustrate examples in which the pressure chamber 4 has a substantially quadrilateral shape when viewed from the liquid discharge direction, that is, the direction in which liquid is discharged from the liquid discharge head. FIG. 8 illustrates an example in which the first electrode 51 is larger than the pressure chamber 4 when viewed from the liquid discharge direction. FIG. 9 illustrates an example in which the first electrode 51, the piezoelectric film 52, and the second electrode 53 are larger than the pressure chamber 4 when viewed from the liquid discharge direction. FIG. 10 illustrates an example in which only the second electrode 53 is larger than the pressure chamber 4 when viewed from the liquid discharge direction. Note that ¼ of the second electrode 53 has been cut out for easy understanding of the configuration of the piezoelectric element 5 in FIG. 10, but actually, the first electrode 51 and the piezoelectric film 52 are entirely covered with the second electrode 53.

Also in the configuration illustrated in FIG. 8, the first electrode 51 is electrically connected to the ground while the pressure chamber 4 is being formed, as in the example illustrated in FIG. 4. As a result, it is possible to satisfactorily prevent the charge-up of the etching surface of the channel substrate 100. In the configuration illustrated in FIG. 9, the first electrode 51 or the second electrode 53 is electrically connected to the ground while the pressure chamber 4 is being formed, as in the example illustrated in FIG. 6. As a result, it is possible to satisfactorily prevent the charge-up of the etching surface of the channel substrate 100. Furthermore, in the configuration illustrated in FIG. 10, the second electrode 53 is electrically connected to the ground while the pressure chamber 4 is being formed, as in the configuration illustrated in FIG. 7. As a result, it is possible to satisfactorily prevent the charge-up of the etching surface of the channel substrate 100. In the configuration illustrated in FIG. 10, the second electrode 53 can cover the piezoelectric film 52 to protect the piezoelectric film 52 from moisture having entered the nozzle forming portion 111 as in the configuration illustrated in FIG. 7.

In the configuration illustrated in FIG. 8, the first electrode 51 larger than the pressure chamber 4 has a substantially quadrilateral shape when viewed from the liquid discharge direction, and the piezoelectric film 52 and the second electrode 53 smaller than the pressure chamber 4 have a circular shape when viewed from the liquid discharge direction. Meanwhile, the piezoelectric film 52 and the second electrode 53 smaller than the pressure chamber 4 may also have a quadrilateral shape similar to the pressure chamber 4 when viewed from the liquid discharge direction. Also in the configuration illustrated in FIG. 10, the piezoelectric film 52 and the first electrode 51 smaller than the pressure chamber 4 may have a quadrilateral shape similar to the pressure chamber 4.

The shapes of the pressure chamber 4, and the first electrode 51, the piezoelectric film 52, and the second electrode 53 of the piezoelectric element as viewed from the liquid discharge direction are not limited to the substantially quadrilateral shape or the circular shape, but may be set to any appropriate shapes such as a regular pentagonal shape and a regular hexagonal shape, according to the configuration of the apparatus.

Figure 11A:
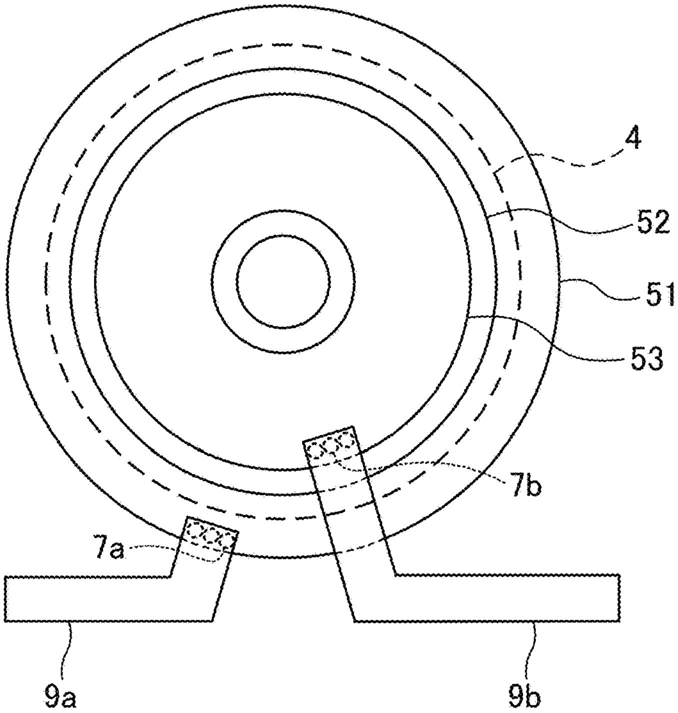
FIGS. 11A and 11B are diagrams illustrating wiring examples in the case of the piezoelectric element illustrated in FIG. 4.
Figure 11B:
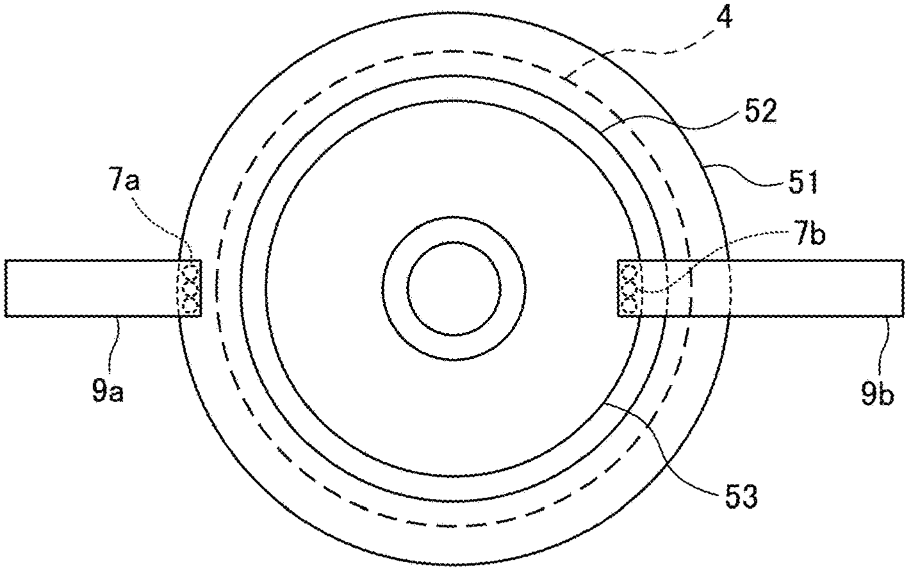
Figure 12A:
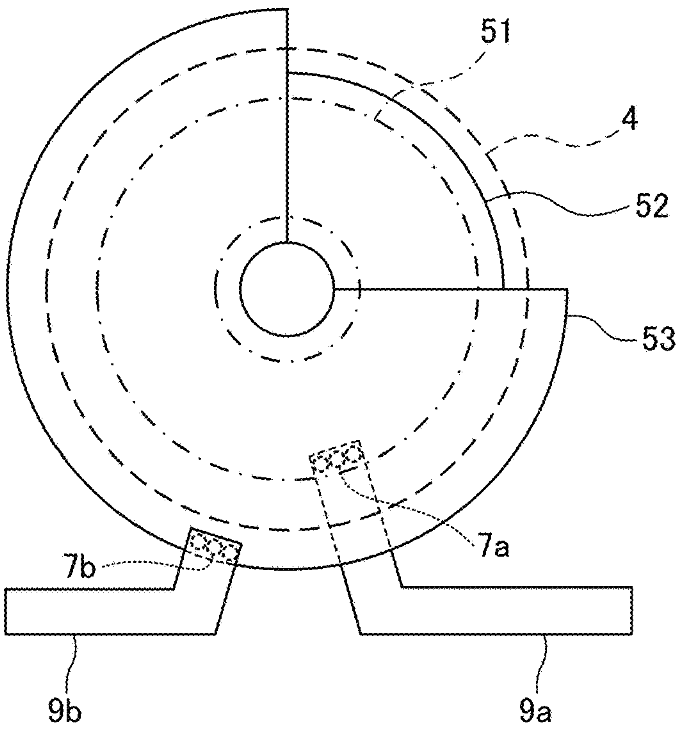
FIGS. 12A and 12B are diagrams illustrating wiring examples in the case of the piezoelectric element illustrated in FIG. 7.
Figure 12B:
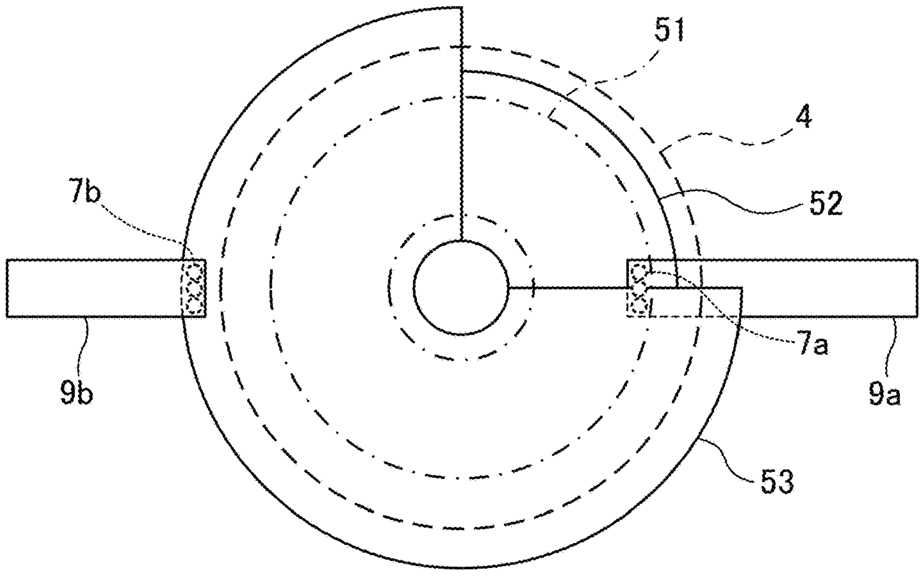

FIGS. 11A and 11B are diagrams illustrating wiring examples in the case of the piezoelectric element illustrated in FIG. 4. FIGS. 12A and 12B are diagrams illustrating wiring examples in the case of the piezoelectric element illustrated in FIG. 7. Note that, as in FIG. 7, ¼ of the second electrode 53 has been cut out for easy understanding of the configuration of the piezoelectric element 5 in FIGS. 12A and 12B, but actually, the first electrode 51 and the piezoelectric film 52 are entirely covered with the second electrode 53.

In the piezoelectric element illustrated in FIG. 4, the second electrode 53 is smaller than the inner diameter of the pressure chamber 4. Therefore, the second lead-out wire 9*b* is formed in a region where the diaphragm 103 is vibrated by the driving of the piezoelectric element 5, as illustrated in FIGS. 11A and 11B. Meanwhile, in the piezoelectric element illustrated in FIG. 7, the first electrode 51 is smaller than the inner diameter of the pressure chamber 4. Therefore, the first lead-out wire 9*a* is formed in a region where the diaphragm 103 is vibrated by the driving of the piezoelectric element 5, as illustrated in FIGS. 12A and 12B.

Therefore, in the configuration of the piezoelectric element illustrated in FIG. 4, the second lead-out wire 9*b* may affect vibration of the diaphragm 103. In the configuration of the piezoelectric element illustrated in FIG. 7, the first lead-out wire 9*a* may affect vibration of the diaphragm 103.

As illustrated in FIGS. 11A, 11B, 12A, and 12B, the first lead-out wire 9*a* and the second lead-out wire 9*b* are drawn out at right angles to circumferential directions of the first electrode 51 and the second electrode 53, respectively. As a result, it is possible to minimize the areas of the lead-out wires formed in the regions where the diaphragm 103 is vibrated. It is thus possible to minimize influence on vibration of the diaphragm 103. The piezoelectric element illustrated in FIG. 4 may be configured such that only the second lead-out wire 9*b* is drawn out at a right angle to the circumferential direction of the electrode. In addition, the piezoelectric element illustrated in FIG. 7 may be configured such that only the first lead-out wire 9*a* is drawn out at a right angle to the circumferential direction of the electrode.

Furthermore, as illustrated in FIGS. 11B and 12B, it is desirable to achieve a relative positional relationship in which the first lead-out wire 9*a* and the second lead-out wire 9*b* are disposed at an angle of 180 degrees to each other in the circumferential direction of the piezoelectric element 5. Disposing the first lead-out wire 9*a* and the second lead-out wire 9*b* in this manner makes it possible to maintain the line symmetry of vibration of the diaphragm 103 as much as possible. As a result, it is possible to prevent the instability of discharging performance.

Also in the configurations illustrated in FIGS. 8 and 10, configuring each of the first lead-out wire 9*a* and the second lead-out wire 9*b* as in the configurations illustrated in FIGS. 11A and 12A makes it possible to minimize the areas of the lead-out wires formed in the regions where the diaphragm 103 is vibrated. Furthermore, it is possible to prevent the instability of discharging performance by adopting a configuration similar to the configurations illustrated in FIGS. 11B and 12B.

In the configurations illustrated in FIGS. 11A and 11B, the second contact 7*b* is formed inside the pressure chamber 4 when viewed from a nozzle surface side. In the configurations illustrated in FIGS. 12A and 12B, the first contact 7*a* is formed inside the pressure chamber 4 when viewed from the nozzle surface side. A configuration in which a contact is thus formed inside the pressure chamber may be disadvantageous in the following respect.

Figure 13:
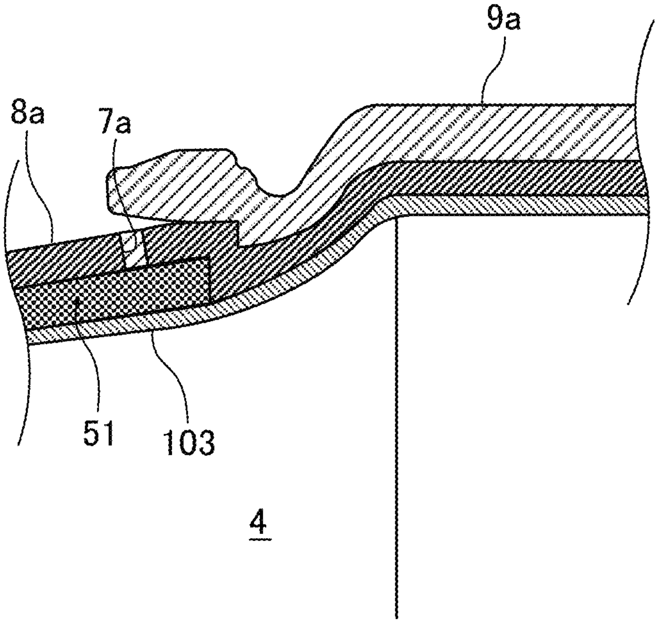
FIG. 13 is an enlarged view of a part in the vicinity of a first contact in a configuration in which the first electrode is smaller than the inner diameter of the pressure chamber.

FIG. 13 is an enlarged view of a part in the vicinity of the first contact 7*a* in a configuration in which the first electrode 51 is smaller than the inner diameter of the pressure chamber 4.

The driving of the piezoelectric element 5 vibrates the diaphragm 103 inside the pressure chamber 4. When the diaphragm 103 vibrates, a portion of the diaphragm 103 of the actuator 110 formed as a layer on the inner portion of the pressure chamber 4 is displaced together with the diaphragm 103. When a contact is located inside the pressure chamber 4, the first lead-out wire 9*a* and the first contact 7*a* are also deformed together with the diaphragm 103. The first lead-out wire 9*a* is electrically connected to the first electrode 51 via the round hole-shaped first contact 7*a* formed in the first insulating film 8*a*. Therefore, the joining of the first lead-out wire 9*a* and the first contact 7*a* and the joining of the first electrode 51 and the first contact 7*a* are weak. As a result, the reliability of joining may not be easily ensured. Therefore, a configuration in which the first contact 7*a* is located inside the pressure chamber 4 is disadvantageous in that when the first contact 7*a* is displaced together with the diaphragm 103, the first contact 7*a* and the first lead-out wire 9*a* may be disconnected from each other as illustrated in FIG. 13. In FIG. 13, the first contact 7*a* and the first lead-out wire 9*a* are disconnected from each other. However, there is a possibility that the first electrode 51 and the first contact 7*a* may be disconnected from each other depending on the situation.

Meanwhile, in a configuration in which the second electrode 53 is smaller than the inner diameter of the pressure chamber 4 as illustrated in FIGS. 11A and 11B, there is a possibility that the second contact 7*b* and the second lead-out wire 9*b* may be disconnected from each other, or that the second contact 7*b* and the second electrode 53 may be disconnected from each other.

Figure 14A:
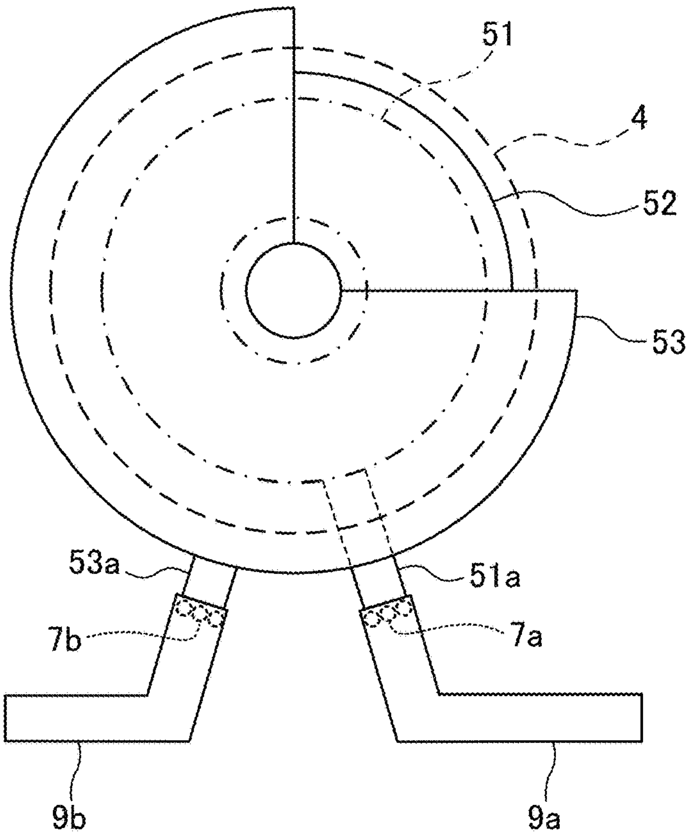
FIGS. 14A and 14B are diagrams illustrating configurations in which each electrode includes an extension wire extending to the outside of the pressure chamber, and the first contact and a second contact are provided outside the pressure chamber.
Figure 14B:
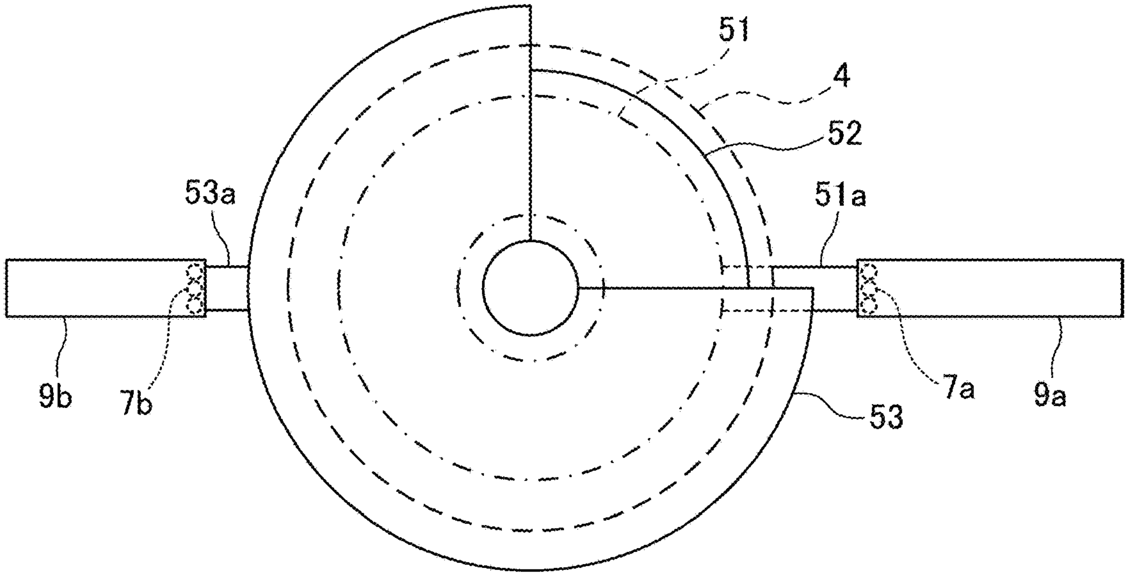

Therefore, as illustrated in FIGS. 14A and 14B, it is desirable that the first electrode 51 and the second electrode 53 include extension wires 51*a* and 53*a* extending to the outside of the pressure chamber 4, respectively, and that the first contact 7*a* and the second contact 7*b* be provided in a region of a side wall separating the pressure chamber 4 from an adjacent pressure chamber 4 where the diaphragm 103 is not displaced. Note that, as in FIG. 7, ¼ of the second electrode 53 has been cut out for easy understanding of the configuration of the piezoelectric element 5 in FIGS. 14A and 14B, but actually, the first electrode 51 and the piezoelectric film 52 are entirely covered with the second electrode 53. In FIGS. 14A and 14B, the first electrode 51 and the second electrode 53 include the extension wires 51*a* and 53*a* extending to the outside of the pressure chamber 4, respectively. Meanwhile, it is possible to adopt a configuration in which the second electrode 53 and the second lead-out wire 9*b* are joined to each other, as in the configurations illustrated in FIGS. 12A and 12B, and only the first electrode 51 includes the extension wire 51*a*. In the configuration illustrated in FIGS. 11A and 11B, it is possible to adopt a configuration in which only the second electrode 53 includes the extension wire 53*a*.

In addition, as illustrated in FIGS. 14A and 14B, the extension wire 53*a* is also drawn out at a right angle to the circumferential directions of the first electrode 51 and the second electrode 53. As a result, it is possible to minimize the areas of the extension wires 51*a* and 53*a* formed in regions where the diaphragm 103 is vibrated. It is thus possible to minimize the influence of the extension wires on vibration of the diaphragm 103. As illustrated in FIG. 14B, it is more desirable to achieve a relative positional relationship in which the extension wire 51*a* of the first electrode and the extension wire 53*a* of the second electrode are disposed at an angle of 180 degrees to each other in the circumferential direction of the piezoelectric element 5. Disposing the extension wires 51*a* and 53*a* in this manner makes it possible to maintain the line symmetry of vibration of the diaphragm 103 as much as possible. As a result, it is possible to prevent the instability of discharging performance.

Also in the configurations illustrated in FIGS. 8 and 10, disposing the extension wires 51*a* and 53*a* as illustrated in FIGS. 14A and 14B makes it possible to maintain the line symmetry of vibration of the diaphragm 103 as much as possible. As a result, it is possible to prevent the instability of discharging performance.

Liquid with which the liquid discharge head is filled enters the nozzle 2, and forms a meniscus in the nozzle. When a predetermined drive waveform (voltage) is applied to each electrode of the piezoelectric element 5, the piezoelectric film 52 vibrates, and the diaphragm 103 vibrates in an up-and-down direction in FIG. 3, Vibration of the diaphragm 103 causes a change in pressure of liquid in the pressure chamber. As a result, the liquid is discharged from the nozzle 2.

Next, a method for manufacturing the liquid discharge head according to the present embodiment will be described.

FIGS. 15 to 24 are diagrams for describing a process of manufacturing the liquid discharge head of the present embodiment, which are cross-sectional views of the liquid discharge head taken along a line orthogonal to a direction in which nozzle holes are arranged.

Figure 15:
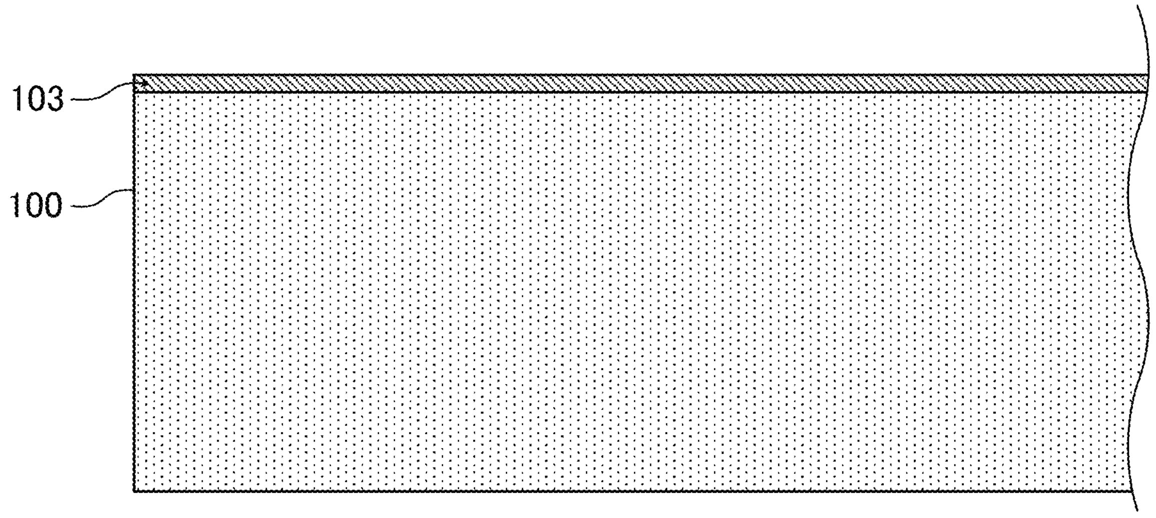
FIG. 15 is a diagram describing a step of forming a drive circuit, a wiring portion, and a diaphragm on a channel substrate.

First, as illustrated in FIG. 15, the diaphragm 103 is formed on the channel substrate 100. The diaphragm 103 may be made of $SiO_2$, SiN, metallic oxide, resin, or any other material as long as the material has at least insulation properties. However, in order to increase displacement, it is desirable to use a material having a low Young's modulus. In addition, considering a difference in a coefficient of linear expansion from the channel substrate 100, it is most desirable to use, as the material of the diaphragm 103, silicon dioxide ($SiO_2$) having a relatively small difference.

Figure 16:
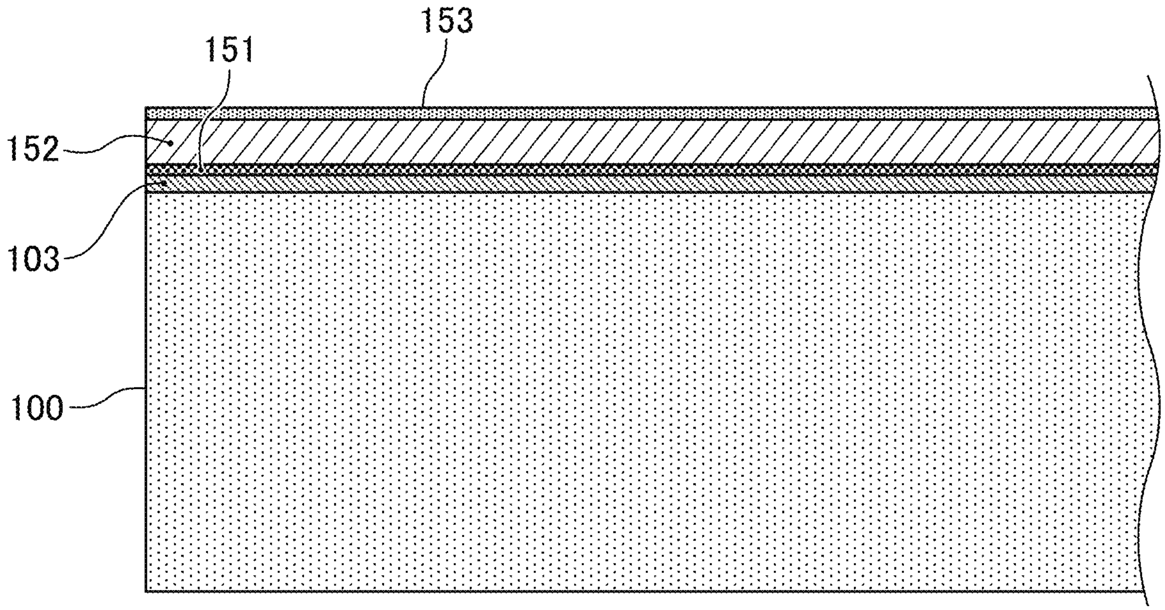
FIG. 16 is a diagram describing a step of performing film formation of a first electrode layer, a piezoelectric layer, and a second electrode layer on the diaphragm.

Next, as illustrated in FIG. 16, a first electrode layer 151, a piezoelectric layer 152, and a second electrode layer 153 are formed as films on the diaphragm 103. The first electrode layer 151 and the second electrode layer 153 are desirably made of a metal having low electric resistance and low reactivity, such as Is or Mo.

Examples of piezoelectric material to be included in the piezoelectric layer 152 include lead zirconate titanate (PZT) and aluminum nitride (AlN). In a case where a drive circuit or a wiring portion is built in the channel substrate 100 for improving density, it is desirable to use a piezoelectric material having a film-forming temperature of 450° C. or lower so as not to damage the drive circuit or the wiring portion. It is thus desirable to use, as the piezoelectric material, AlN having a film-forming temperature of 450° C. or lower.

Furthermore, it is also possible to obtain the following advantages by using AlN as the piezoelectric material. That is, it is possible to improve piezoelectric properties by making the crystalline orientation of the piezoelectric film 52 uniform. Therefore, an orientation control layer is provided between the diaphragm 103 and the first electrode 51 so as to control the orientation in some cases. When AlN is used as the piezoelectric material of the piezoelectric film 52, it is possible to make the lattice constant of the first electrode 51 made of Mo close to AlN by using AlN also as the orientation control layer. As a result, the crystalline orientation of the piezoelectric film 52 becomes uniform, so that piezoelectric properties can be improved.

Film formation of the first electrode layer 151, the piezoelectric layer 152, and the second electrode layer 153 can be performed by a sputtering method or a sol-gel method. Since film-forming temperature is high in the latter method, it is desirable to use the sputtering method to perform the film formation when the drive circuit or the wiring portion is built in the channel substrate 100.

Figure 17:
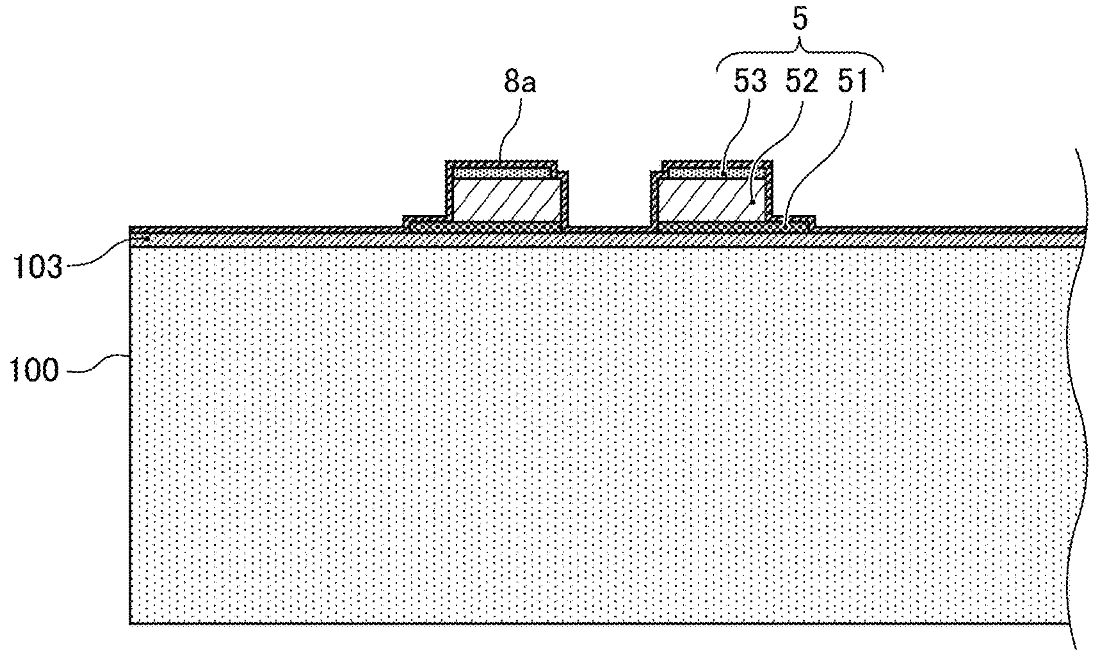
FIG. 17 is a diagram describing a step of performing film formation of a first insulating film.

After film formation of the first electrode layer 151, the piezoelectric layer 152, and the second electrode layer 153 is performed, the first electrode layer 151, the piezoelectric layer 152, and the second electrode layer 153 are each formed in an appropriate shape to obtain the piezoelectric element 5 including the first electrode 51, the piezoelectric film 52, and the second electrode 53, as illustrated in FIG. 17. The first electrode layer 151, the piezoelectric layer 152, and the second electrode layer 153 are processed by photolithography and etching. As a result, it is possible to easily obtain the first electrode 51, the piezoelectric film 52, and the second electrode 53 each having a desired shape. Etching includes wet etching and dry etching. Dry etching can prevent corrosion of the first electrode 51, the second electrode 53, and the piezoelectric film 52. Therefore, it is desirable to use dry etching. Residue resulting from the processing tends to remain after dry etching. Therefore, a cleaning step may be performed so as to remove residue after shaping is performed.

After the shaping of the first electrode 51, the piezoelectric film 52, and the second electrode 53 is performed, the first insulating film 8*a* is formed as illustrated in FIG. 17. As with the diaphragm 103, the first insulating film 8*a* desirably has insulation properties, a small Young's modulus, and a coefficient of linear expansion close to the coefficient of linear expansion of constituent material. Therefore, it is desirable to use $SiO_2$ as with the diaphragm 103.

Figure 18:
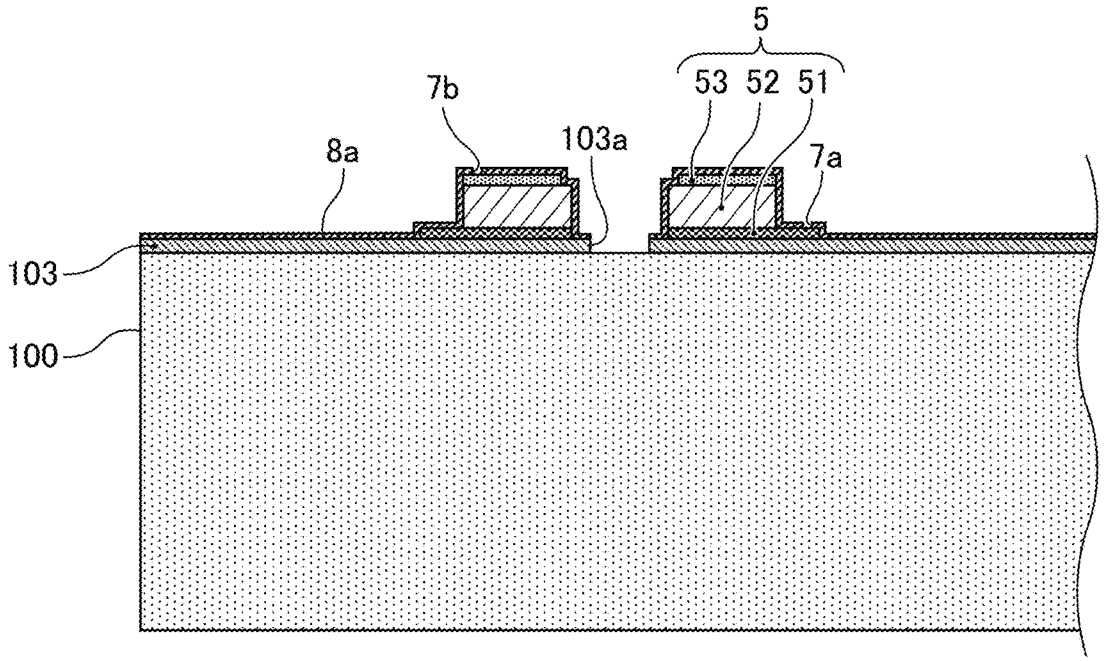
FIG. 18 is a diagram describing a step of forming a plurality of contacts.

After the first insulating film 8*a* is formed, the first contact 7*a* and the second contact 7*b*, which are hole-shaped contacts, are formed in the first insulating film 8*a* by photolithography and etching as illustrated in FIG. 18. A nozzle forming hole 103*a* for forming the nozzle 2 is also formed in the diaphragm 103.

Figure 19:
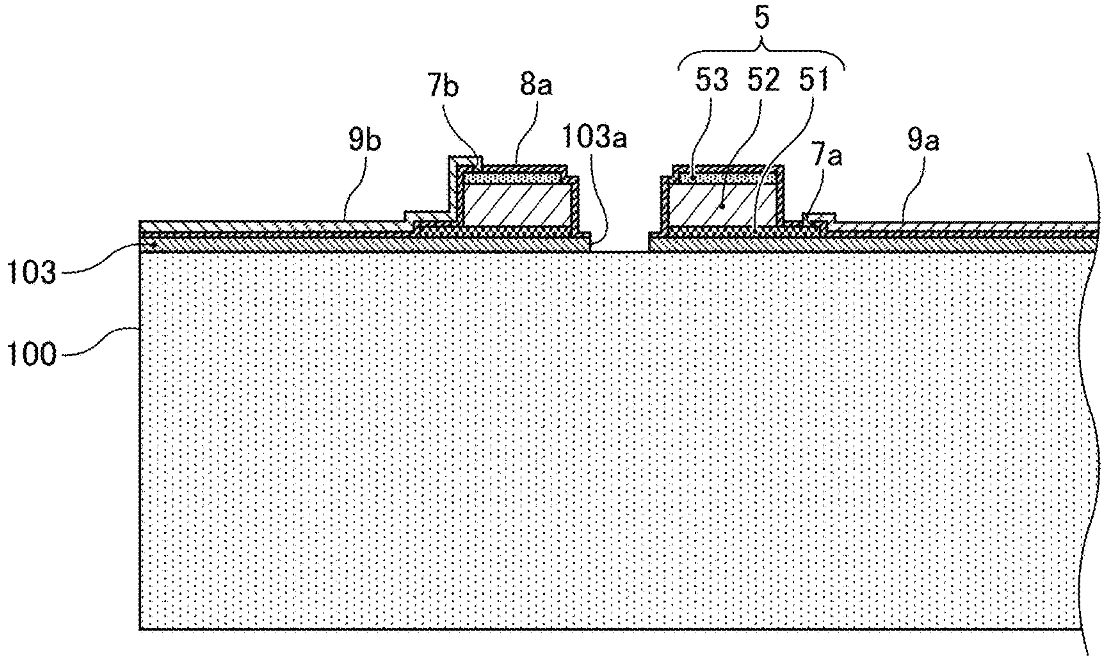
FIG. 19 is a diagram describing a step of forming lead-out wires.

Next, as illustrated in FIG. 19, the first lead-out wire 9*a* and the second lead-out wire 9*b* are formed. In general, Al or an AlCu alloy is used as the material of each of the first lead-out wire 9*a* and the second lead-out wire 9*b*. As a result of this step, the first lead-out wire 9*a* is electrically connected to the first electrode 51 via the first contact 7*a*, and the second lead-out wire 9*b* is electrically connected to the second electrode 53 via the second contact 7*b*.

Figure 20:
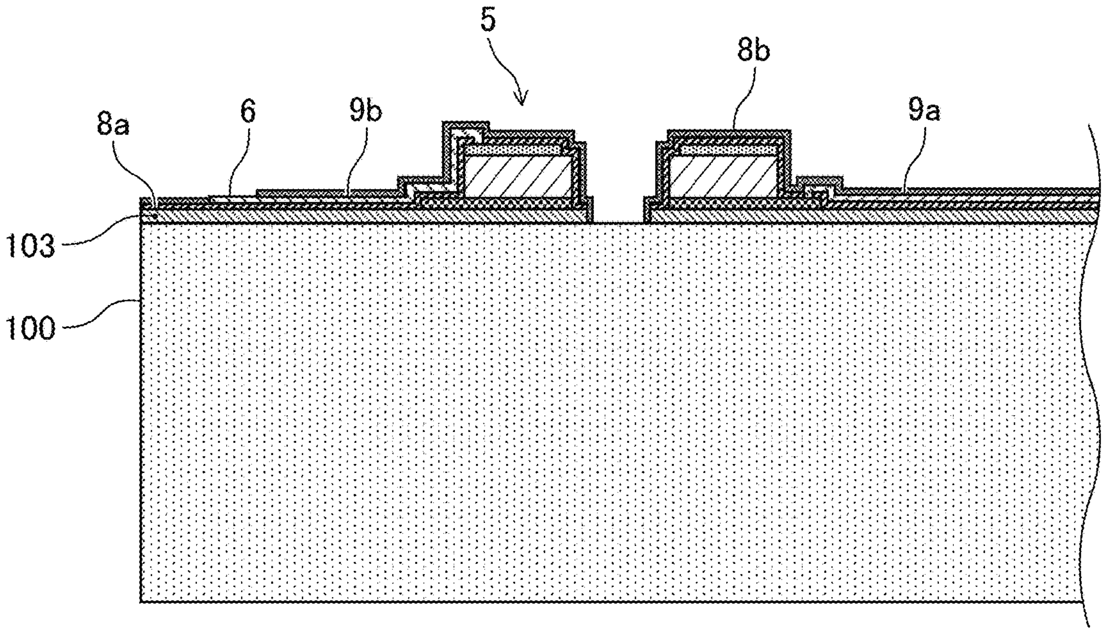
FIG. 20 is a diagram describing a step of performing film formation of a second insulating film.

Next, as illustrated in FIG. 20, the second insulating film 8*b* is formed in such a way as to cover the first lead-out wire 9*a*, the second lead-out wire 9*b*, and the piezoelectric element 5. As with the first insulating film 8*a*, the second insulating film 8*b* may also be made of $SiO_2$. However, in order to improve resistance to moisture, it is desirable to use SiN that has moisture resistance and is widely used as a protective film for semiconductors. The second insulating film 8*b* has both of insulation properties and moisture resistance. As a result, the actuator 110 can be made thinner than in a case where a moisture-proof protective film is formed on the second insulating film 8*b*. As a result, the diaphragm 103 is easily deformed, so that vibration efficiency can be enhanced. In addition, in a configuration in which the piezoelectric film 52 is protected by the second electrode 53 covering the piezoelectric film 52 as illustrated in FIG. 7, the second insulating film 8*b* may be made of the same material as the first insulating film 8*a*, and need not have moisture resistance. Next, the electrical connection pad 6 is formed by photolithography and etching.

As a result of the above steps, the piezoelectric element 5 can be driven.

Figure 21:
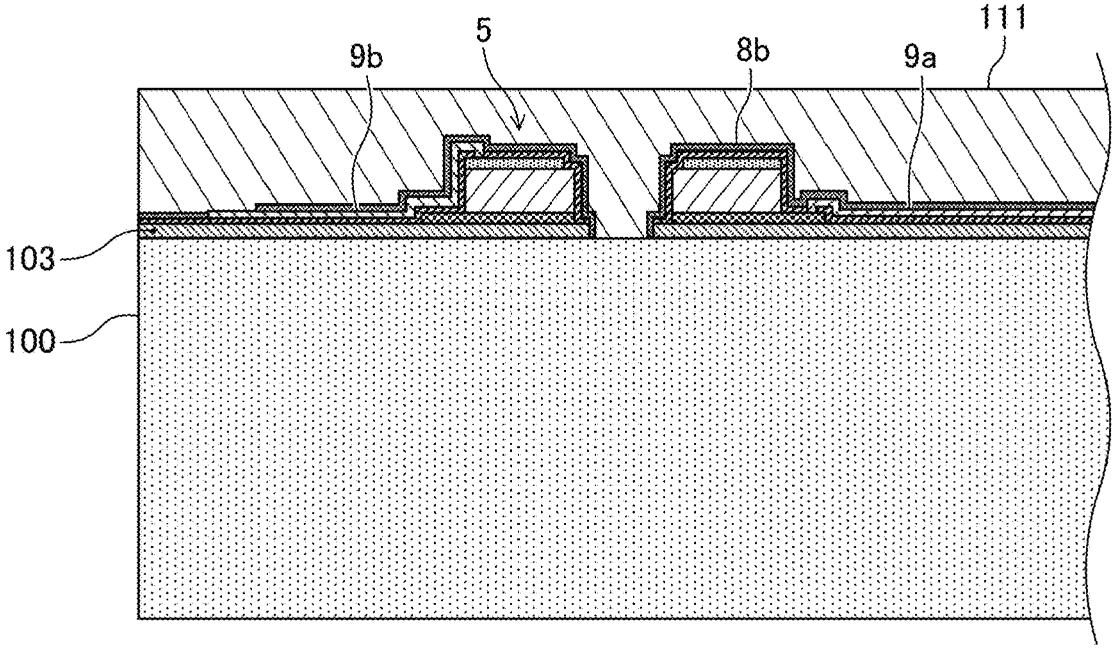
FIG. 21 is a diagram describing a step of performing film formation of a nozzle forming portion.
Figure 22:
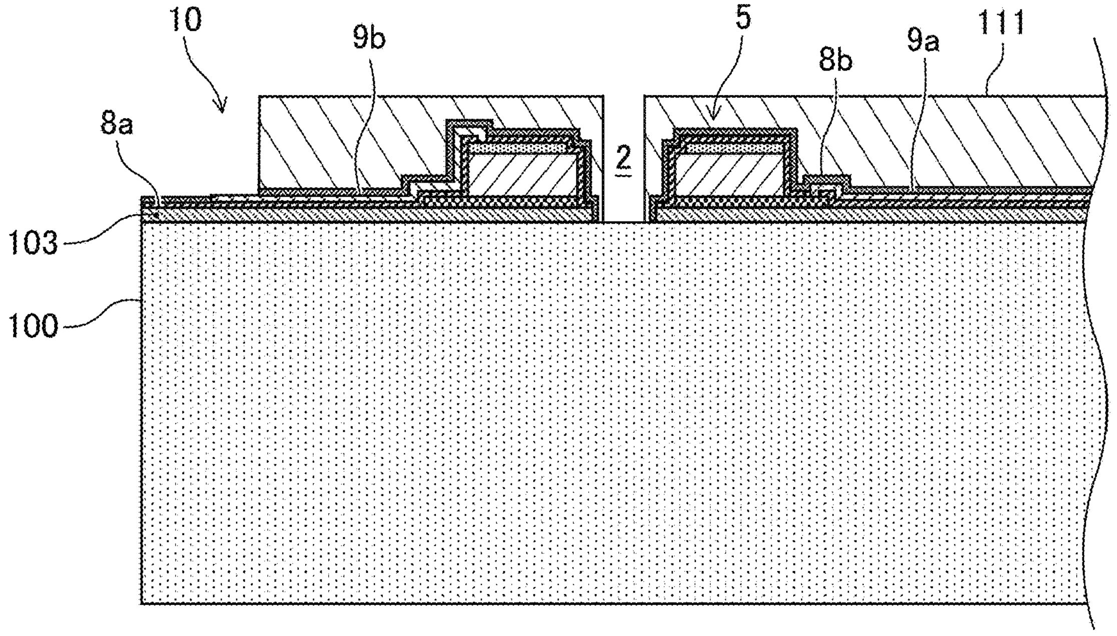
FIG. 22 is a diagram describing a step of forming a nozzle and a pad opening.

Next, as illustrated in FIG. 21, film formation of the nozzle forming portion 111 is performed for nozzle formation. It is desirable that film formation of the nozzle forming portion 111 be performed by spin coating, and that the nozzle forming portion 111 be formed by use of resin that can be applied by spin coating. From the viewpoint of chemical resistance, it is desirable to use SU-8 thick film resist, benzocyclobutene (BCB), or the like. Then, as illustrated in FIG. 22, the nozzle 2 and the pad opening 10 are formed by etching. The nozzle 2 and the pad opening 10 are formed by dry etching.

Figure 23:
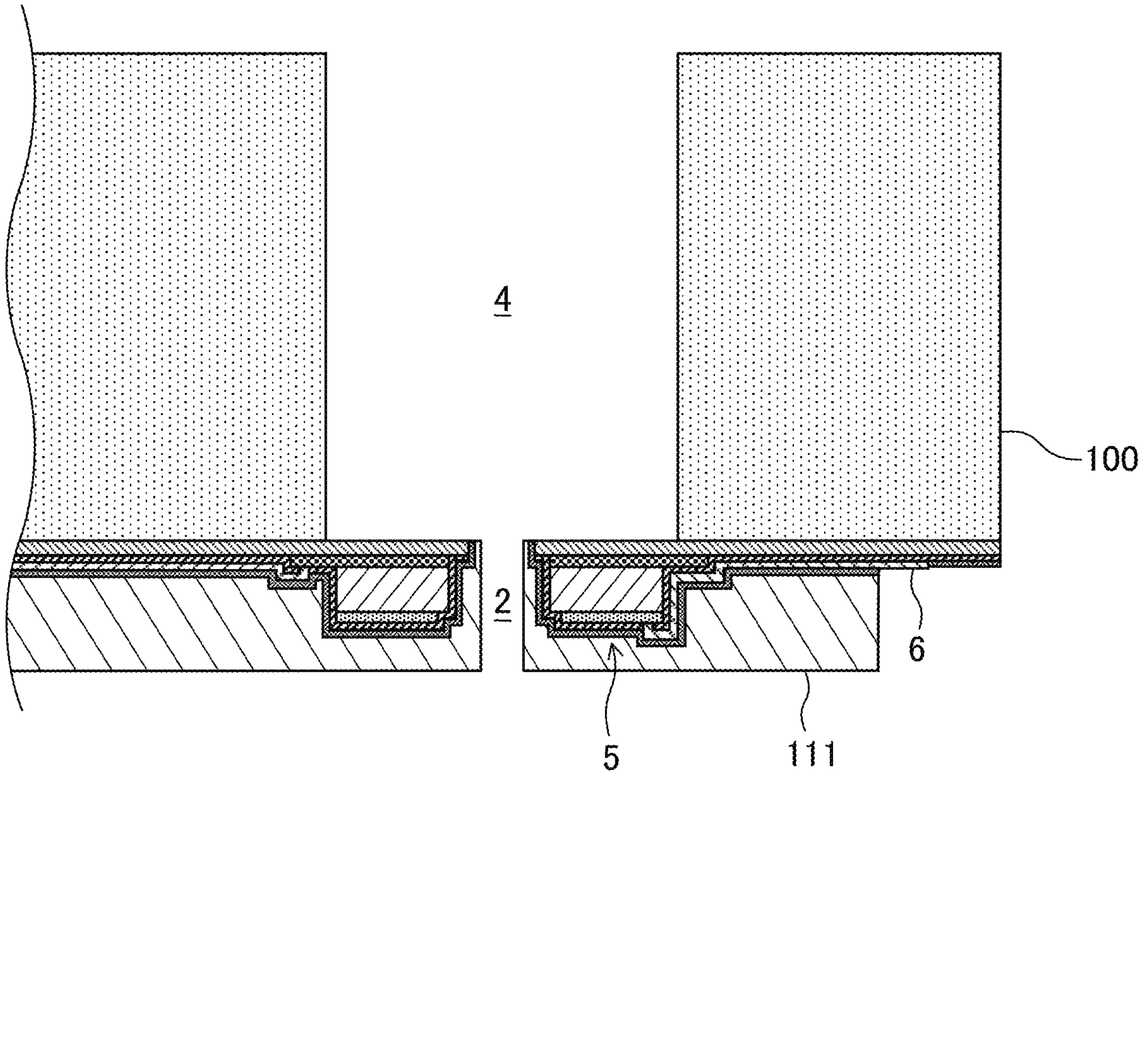
FIG. 23 is a diagram describing a step of forming the pressure chamber.

Next, as illustrated in FIG. 23, the channel substrate 100 is processed by Si etching to form a plurality of the pressure chambers 4 each having a circular hole shape. It is desirable to increase the aspect ratio of the cross section of the pressure chamber 4 so as to increase discharge efficiency and reduce crosstalk (make the liquid chamber deep relative to the diameter of the liquid chamber). Therefore, in the present embodiment, the pressure chamber 4 is formed by deep reactive ion etching (DRIE). In DRIE, a CF-based gas such as CF4 or C4F8, or an SF-based gas such as SF6 is used as etching gas.

Figure 24A:
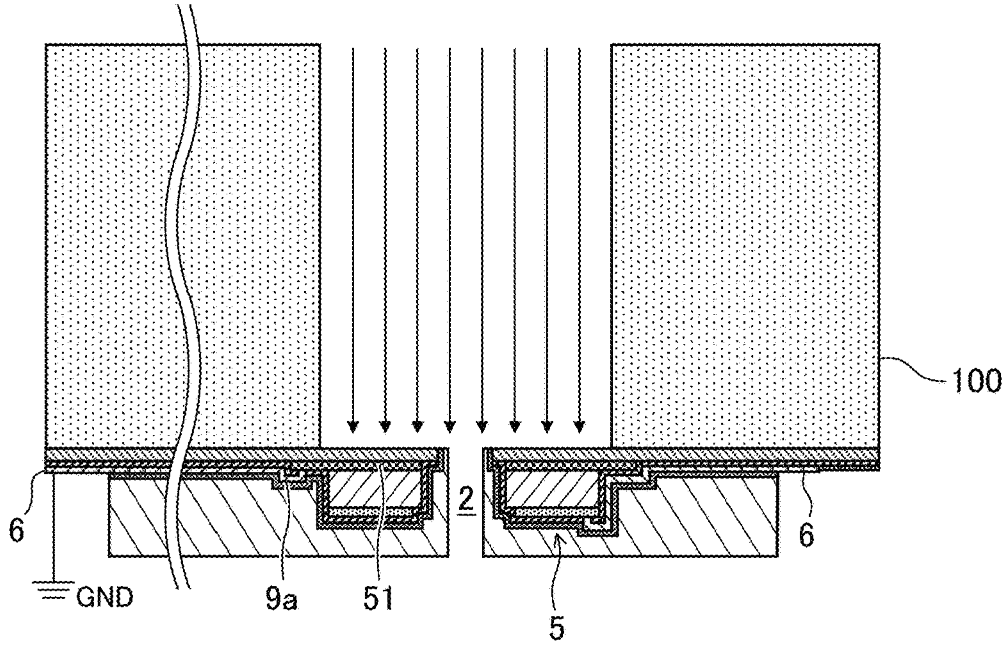
FIG. 24A is a diagram describing formation of the pressure chamber of the present embodiment.
Figure 24B:
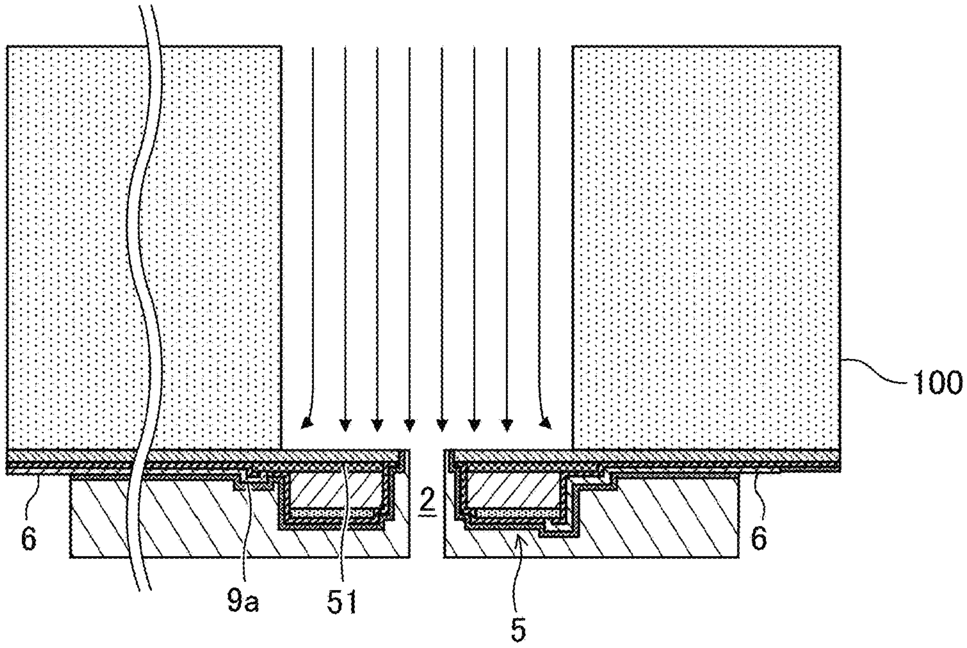
FIG. 24B is a diagram describing formation of a conventional pressure chamber.

FIG. 24A is a diagram describing formation of the pressure chamber in the present embodiment. FIG. 24B is a diagram describing formation of a conventional pressure chamber.

In the present embodiment, the electrical connection pad 6 is electrically connected to the ground while the pressure chamber 4 is being formed, as illustrated in FIG. 24A.

DRIE is ion etching. In the conventional example illustrated in FIG. 24B, as etching progresses (=the target is etched deeper), the etching surface is charged up, and an electric field is disturbed in the vicinity of the etched region. As a result, as indicated by arrows in FIG. 24B, ions are bent due to disturbance of the electric field in the vicinity of the etched region. Thus, there is a possibility that so-called notching, bowing, or the like may occur. In the notching, a diaphragm-side end portion of the side wall of the pressure chamber 4 is excessively etched. In the bowing, the wall surface of the pressure chamber 4 becomes bowed. Therefore, in the conventional example illustrated in FIG. 24B, the pressure chamber 4 may not be accurately shaped. Thus, there is a possibility that desired discharge characteristics may not be obtained.

In contrast, in the present embodiment, before the pressure chamber 4 is formed, the piezoelectric element 5, the first lead-out wire 9*a* and the second lead-out wire 9*b,* the electrical connection pads 6, and the like are formed to allow the piezoelectric element 5 to be driven (allow voltage to be applied to the piezoelectric element 5). Therefore, as illustrated in FIG. 24A, either one of the pair of electrodes of the piezoelectric element 5 can be electrically connected to the ground while the pressure chamber 4 is being formed. This makes it possible to prevent the charge-up of the etching surface of the channel substrate 100, and prevent disturbance of the electric field in the vicinity of the etched region. As a result, it is possible to prevent released ions from being bent, and prevent occurrence of notching and bowing. Therefore, the pressure chamber 4 can be accurately shaped, and desired discharge characteristics can be obtained.

In the present embodiment, the outer diameter of either one of the pair of electrodes of the piezoelectric element 5 is larger than the inner diameter of the pressure chamber 4. Thus, the electrode larger than the inner diameter of the pressure chamber 4 is electrically connected to the ground while the pressure chamber 4 is being formed. The charge on the etching surface of the channel substrate 100 can easily escape to the electrodes. As a result. the charging (charge-up) of the side wall surface of the pressure chamber 4 formed by DRIE can be satisfactorily prevented. This makes it possible to etch the channel substrate 100 without causing released ions to be bent. As a result, the pressure chamber 4 can be accurately formed.

Thereafter, a protective film is formed on the inner peripheral surface of the nozzle 2 or the pressure chamber 4, or a water-repellent film is formed on the nozzle surface, as needed. Then, the frame member 120 in which the common chamber 3 has been formed is joined to the back surface of the channel substrate 100 to form the liquid discharge head 1.

In the nozzle vibration type liquid discharge head, accuracy of the positional relationship between the channel substrate 100 and the actuator 110 having nozzles greatly affects discharge characteristics. Therefore, it is desirable to ensure high dimensional accuracy at the time of manufacturing. Therefore, in a case where the actuator 110 having the nozzles is joined to the channel substrate 100 having the pressure chamber 4 to form the liquid discharge head, it is desirable to perform a highly accurate joining process. In contrast, in the present embodiment, films of materials forming the actuator 110 are sequentially formed on the channel substrate 100, and predetermined processing is performed. As a result, the actuator 110 is formed directly on the channel substrate 100. This eliminates the need for a highly accurate joining process, and enables the liquid discharge head to be easily formed.

In a configuration in which the diameter of the second electrode 53 is larger than the diameters of the piezoelectric film 52 and the first electrode 51, and the piezoelectric film 52 is covered with the second electrode 53 as illustrated in FIGS. 12A and 12B, manufacturing is performed, for example, as follows. That is, only the first electrode layer 151 and the piezoelectric layer 152 are formed as films on the diaphragm 103. Then, the first electrode 51 and the piezoelectric film 52 are formed. After formation of the first electrode 51 and the piezoelectric film 52, the first insulating film 8*a,* is formed into a predetermined shape by film formation and etching. Then, after film formation of the second electrode layer 153, etching is performed to form the second electrode 53 covering the piezoelectric film 52.

Next, an example of the liquid discharge apparatus according to the present embodiment will be described with reference to FIGS. 25 and 26.

Figure 25:
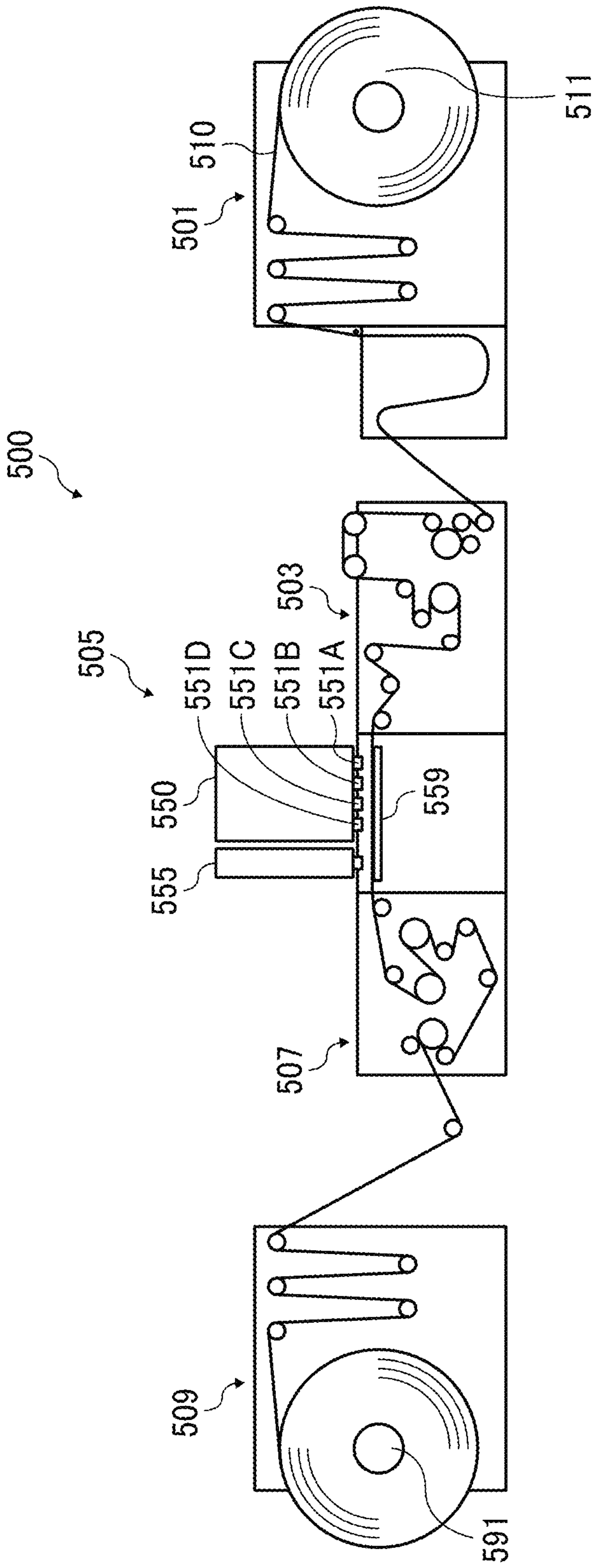
FIG. 25 is an explanatory diagram schematically illustrating a printer in the present embodiment.

FIG. 25 is an explanatory diagram schematically illustrating a printer that is an inkjet recording apparatus serving as the liquid discharge apparatus in the present embodiment.

Figure 26:
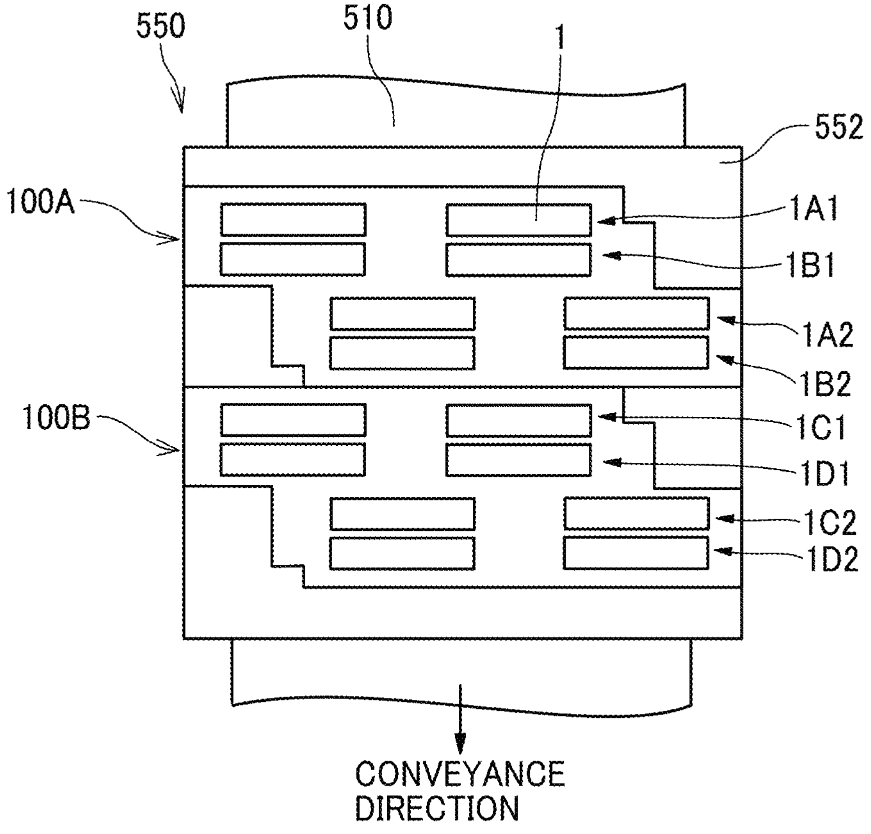
FIG. 26 is an explanatory diagram illustrating a plan view of an example of a head device of the printer.

FIG. 26 is an explanatory diagram illustrating a plan view of an example of a head device of the printer of the present embodiment.

A printer 500 serving as the liquid discharge apparatus includes a feeder 501 and a guide conveyor 503. The feeder 501 carries in a continuous medium 510. The guide conveyor 503 guides and conveys the continuous medium 510 carried in by the feeder 501 to a printing unit 505. The printer 500 also includes the printing unit 505, a dryer 507, an ejector 509, and the like. The printing unit 505 performs printing by discharging liquid onto the continuous medium 510 to form an image. The dryer 507 dries the continuous medium 510. The ejector 509 ejects the continuous medium 510.

The continuous medium 510 is fed from a winding roller 511 of the feeder 501, guided and conveyed with rollers of the feeder 501, the guide conveyor 503, the dryer 507, and the ejector 509, and wound around a take-up roller 591 of the ejector 509. In the printing unit 505, the continuous medium 510 is conveyed on a conveyance guide 559 in such a way as to face a head device 550. An image is formed on the continuous medium 510 by liquid discharged from the head device 550.

In the printer 500 of the present embodiment, a common base member 552 in the head device 550 includes two head modules 100A and 100B according to the present embodiment described above.

When an arrangement direction of the liquid discharge heads 1 of the head modules 100A and 100B in a direction orthogonal to a conveyance direction is defined as a head arrangement direction, head arrays 1A1 and 1A2 of the head module 100A discharge liquid of the same color, Similarly, head arrays 1B1 and 1B2 of the head module 100A are grouped as one set that discharge liquid of the same desired color. Head arrays 1C1 and 1C2 of the head module 100B are grouped as one set that discharge liquid of the same desired color. Head arrays 1D1 and 1D2 of the head module 100B are grouped as one set that discharge liquid of the same desired color.

Next, another example of the printer serving as the liquid discharge apparatus according to the present embodiment will be described with reference to FIGS. 27 and 28.

Figure 27:
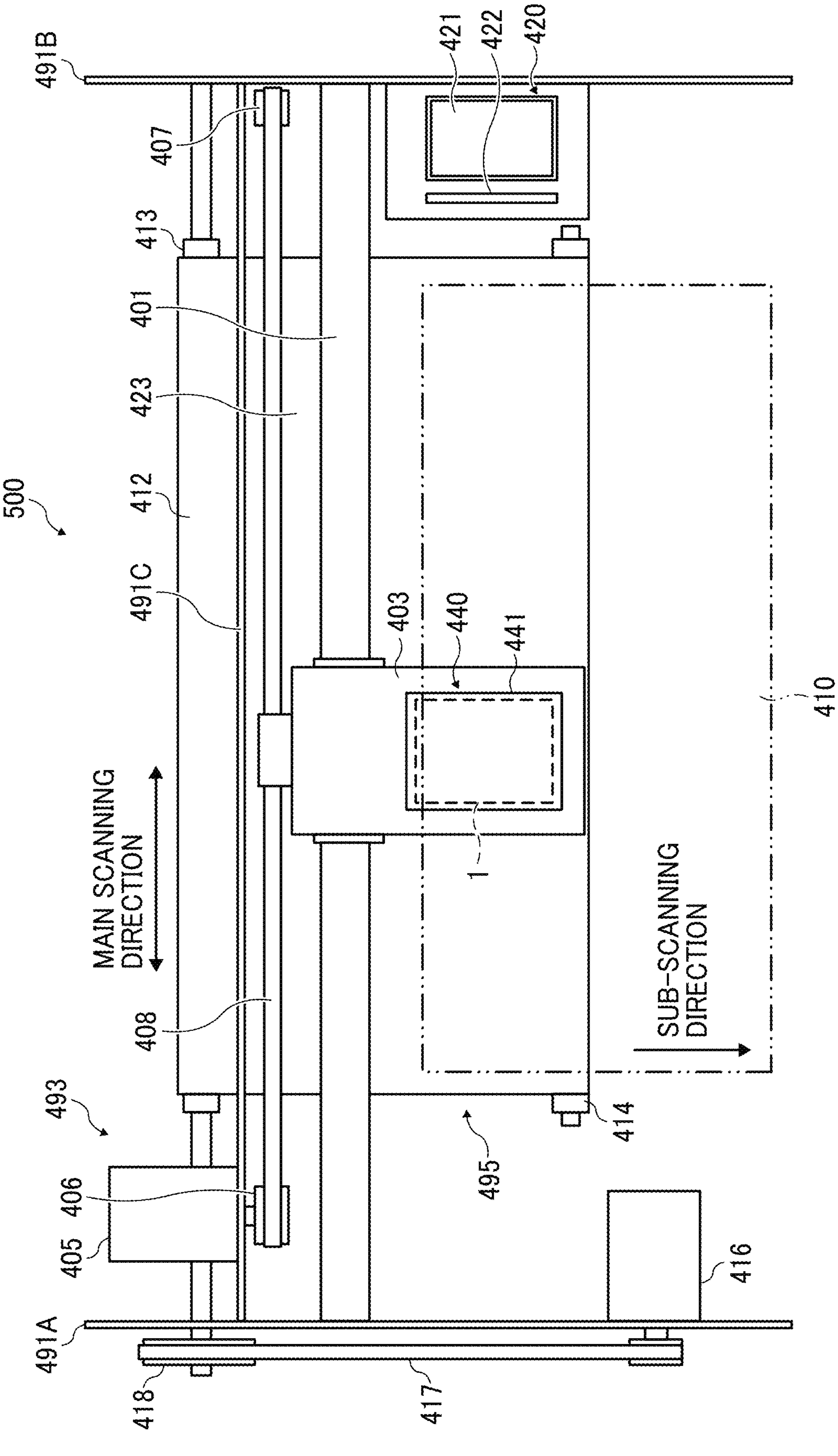
FIG. 27 is an explanatory diagram illustrating a plan view of a main part of a printer of another example.
Figure 28:
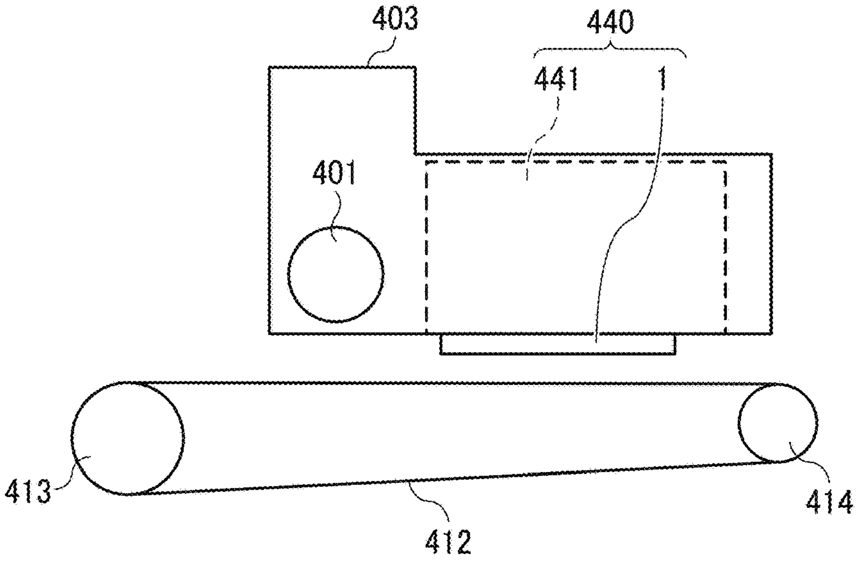
FIG. 28 is an explanatory diagram illustrating a side view of the main part of the printer of another example.

FIG. 27 is an explanatory diagram illustrating a plan view of a main part of the printer of the present example FIG. 28 is an explanatory diagram illustrating a side view of the main part of the printer of the present example.

The printer 500 of the present example is a serial head apparatus. In the printer 500, a main scan moving unit 493 causes a carriage 403 to reciprocate in a main scanning direction. The main scan moving unit 493 includes a guide 401, a main scan motor 405, a timing belt 408, and the like. The guide 401 is bridged between a left side plate 491A and a right-side plate 491B to movably hold the carriage 403. The main scan motor 405 reciprocally moves the carriage 403 in the main scanning direction via the timing belt 408 bridged between a drive pulley 406 and a driven pulley 407.

The carriage 403 is equipped with a liquid discharge device 440 in which the liquid discharge head 1 according to the present embodiment and a head tank 441 are integrated. The liquid discharge head 1 discharges liquid of each color of, for example, yellow (Y), cyan (C), magenta (M), and black (K). The liquid discharge head 1 includes a nozzle array including multiple nozzles arrayed in a sub-scanning direction orthogonal to the main scanning direction. The liquid discharge head 1 is mounted on the carriage 403 in such a way as to discharge liquid downward. The liquid discharge head 1 is connected to a liquid circulation apparatus. Thus, liquid of a desired color is circulated and supplied.

The printer 500 includes a conveyor 495 that conveys a sheet 410. The conveyor 495 includes a conveyance belt 412 as a conveyor, and a sub scan motor 416 that drives the conveyance belt 412. The conveyance belt 412 attracts the sheet 410, and conveys the sheet 410 to a position where the sheet 410 faces the liquid discharge head 1. The conveyance belt 412 is an endless belt stretched between a conveyance roller 413 and a tension roller 414. Attraction of the sheet 410 to the conveyance belt 412 may be applied by electrostatic adsorption, air suction, or the like. The conveyance belt 412 rotates in the sub-scanning direction as the conveyance roller 413 is rotationally driven by the sub scan motor 416 via a timing belt 417 and a timing pulley 418.

A maintenance unit 420 is disposed at one side of the carriage 403 in the main scanning direction and on a lateral side of the conveyance belt 412. The maintenance unit 420 maintains the liquid discharge head 1 in good condition. The maintenance unit 420 includes, for example, a cap 421 and a wiper 422. The cap 421 caps the nozzle surface of the liquid discharge head 1. The wiper 422 wipes the nozzle surface. The main scan moving unit 493, the maintenance unit 420, and the conveyor 495 are mounted in a housing including the left side plate 491A, the right-side plate 491B, and a back plate 491C.

In the printer 500 configured as described above, the sheet 410 is fed onto and attracted by the conveyance belt 412, and is conveyed in the sub-scanning direction by rotation of the conveyance belt 412. The liquid discharge head 1 is driven in response to image signals while the carriage 403 is being moved in the main scanning direction. As a result, liquid is discharged to the sheet 410 at rest, to form an image on the sheet 410.

Next, another example of the liquid discharge device according to the present embodiment will be described with reference to FIG. 29.

Figure 29:
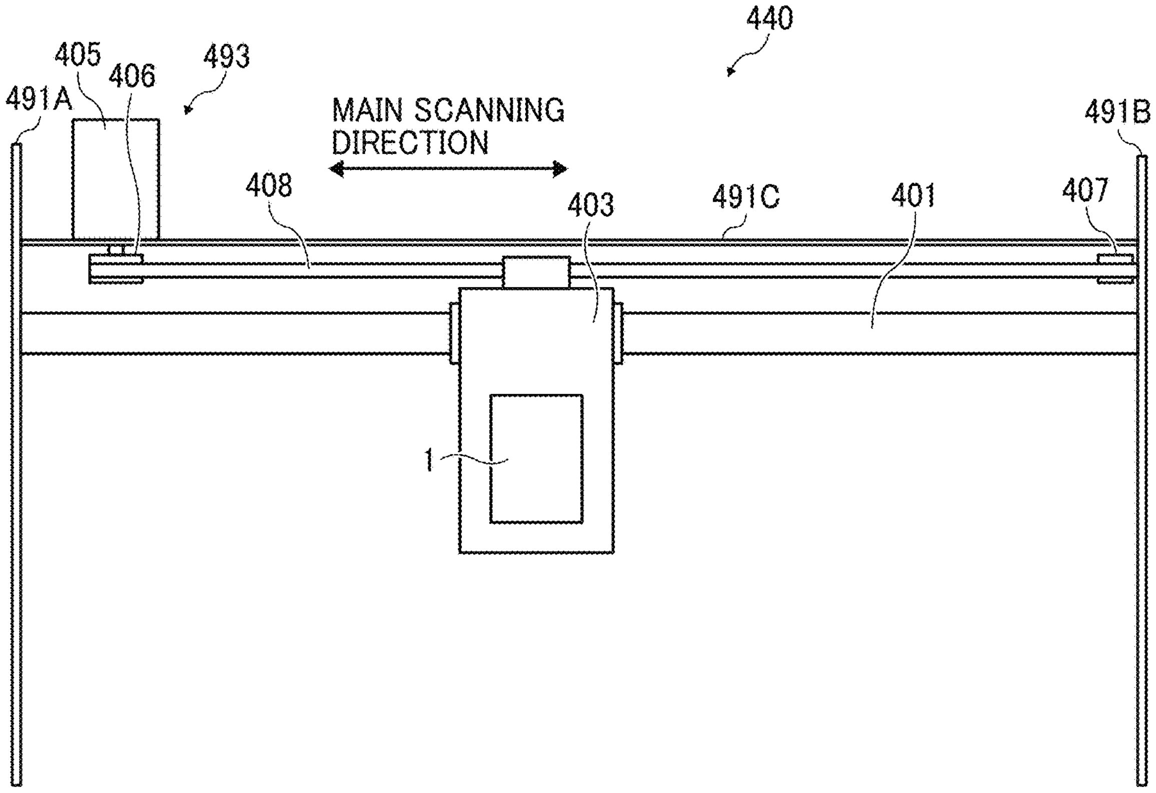
FIG. 29 is an explanatory diagram illustrating a plan view of a main part of a liquid discharge device of another example.

FIG. 29 is an explanatory diagram illustrating a plan view of a main part of a liquid discharge device of the present example.

The liquid discharge device 440 includes a housing portion, the main scan moving unit 493, the carriage 403, and the liquid discharge head 1 among members included in the liquid discharge apparatus. The housing portion includes the left side plate 491A, the right-side plate 491B, and the back plate 491C.

Note that, in the liquid discharge device 440, the maintenance unit 420 described above may be mounted on the right-side plate 491B, for example.

Next, still another example of the liquid discharge device according to the present embodiment will be described with reference to FIG. 30.

Figure 30:
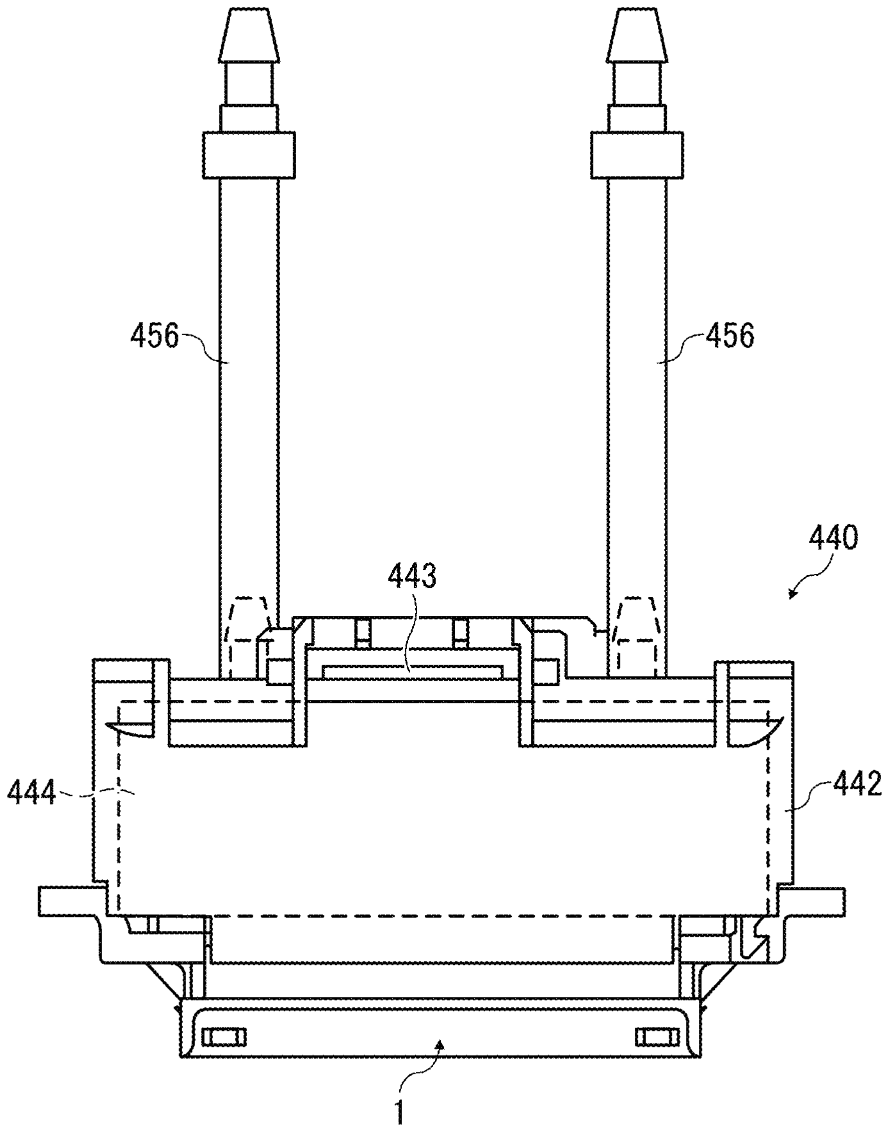
FIG. 30 is an explanatory diagram illustrating a front view of a liquid discharge device of still another example.

FIG. 30 is an explanatory diagram illustrating a front view of a liquid discharge device of the present example.

The liquid discharge device 440 includes the liquid discharge head 1 to which a channel part 444 is attached, and tubes 456 connected to the channel part 444.

The channel part 444 is disposed inside a cover 442. Instead of the channel part 444, the liquid discharge device 440 may include the head tank 441. A contact 443 for electrical connection with the liquid discharge head 1 is provided above the channel part 444.

In a case where the nozzle vibration type liquid discharge head of the present embodiment is used, the piezoelectric element 5 is disposed in proximity to a print medium (the continuous medium 510 in FIG. 25, and the sheet 410 in FIG. 27) and a conveyance structure (the conveyance guide 559 in FIG. 25, and the conveyance belt 412 in FIG. 27) disposed in such a way as to face the liquid discharge head. Therefore, when the print medium or the conveyance structure has a high electric field, there is a possibility that the piezoelectric element 5 is likely to be subjected to electric interference. In addition, charged mist is likely to occur in the nozzle vibration system. Charged mist is caused by liquid discharged from the nozzle and attracted by the electric field of the electrodes of the piezoelectric element 5.

In the piezoelectric element, the second electrode 53 is disposed closer to the print medium or the conveyance structure than the first electrode 51. Therefore, it is desirable to ground the second electrode 53. As a result of grounding the second electrode 53, it is possible to prevent electric interference with the piezoelectric element 5 when the print medium or the conveyance structure has a high electric field, and is also possible to reduce charged mist adhering to the nozzle. In particular, when a configuration is adopted in which the second electrode 53 covers the piezoelectric material as illustrated in FIGS. 7 and 10, it is desirable that the second electrode 53 be grounded. This is because it is possible to prevent electric field leakage to the outside, and to favorably reduce charged mist adhering to the nozzle.

In the present embodiment, liquid to be discharged is not limited to a particular liquid as long as the liquid has viscosity or surface tension that allows the liquid to be discharged from a head (liquid discharge head). However, preferably, the viscosity of the liquid is not greater than 30 mPa·s under ordinary temperature and ordinary pressure or when heated or cooled. Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant. Such a solution, a suspension, or an emulsion can be used for, e.g., inkjet ink, surface treatment solution, a liquid for forming components of electronic element or light-emitting element or for forming a resist pattern of electronic circuit, or a material solution for three-dimensional fabrication.

Examples of an energy source that generates energy for discharging liquid include a piezoelectric actuator (a laminated piezoelectric element or a thin-film piezoelectric element), a thermal actuator that employs a thermoelectric conversion element, such as a heating resistor, and an electrostatic actuator including a diaphragm and counter electrodes.

The "liquid discharge device" is an assembly of parts relating to liquid discharge. The term "liquid discharge device" represents a structure including the liquid discharge head and a functional part(s) or unit(s) combined with the liquid discharge head to form a single unit. For example, the "liquid discharge device" includes a combination of the liquid discharge head with at least one of a head tank, a carriage, a supply unit, a maintenance unit, a main scan moving unit, or a liquid circulation apparatus.

Examples of the "single unit" include a combination in which the liquid discharge head and one or more functional parts and units are secured to each other through, e.g., fastening, bonding, or engaging, and a combination in which one of the liquid discharge head and the functional parts and units is movably held by another. The liquid discharge head, and the functional part(s) or unit(s) may be detachably attached to each other.

For example, the liquid discharge head and the head tank may form the liquid discharge device as a single unit. Alternatively, the liquid discharge head and the head tank coupled (connected) with a tube or the like may form the liquid discharge device as a single unit. A unit including a filter may be added at a position between the head tank and the liquid discharge head of the liquid discharge device.

In another example, the liquid discharge head and the carriage may form the liquid discharge device as a single unit.

In still another example, the liquid discharge device includes the liquid discharge head movably held by a guide that forms part of a main scan moving unit, so that the liquid discharge head and the main scan moving unit form a single unit. The liquid discharge device may include the liquid discharge head, the carriage, and the main scan moving unit that form a single unit.

In still another example, a cap that forms part of the maintenance unit may be secured to the carriage with the liquid discharge head mounted thereon so that the liquid discharge head, the carriage, and the maintenance unit form a single unit to form the liquid discharge device.

Furthermore, in still another example, the liquid discharge device includes a tube connected to the head tank or the liquid discharge head with a channel part mounted thereon, so that the liquid discharge head and the supply unit form a single unit. Liquid in a liquid reservoir source such as an ink cartridge is supplied to the liquid discharge head through this tube.

The main scan moving unit may be a guide only. The supply unit may be a tube(s) only or a loading unit only.

The "liquid discharge device" includes a head module including the above-described liquid discharge head, and a head device in which the above-described functional parts and mechanisms are combined to form a single unit.

The term "liquid discharge apparatus" used herein also represents an apparatus that includes the liquid discharge head, the liquid discharge device, the head module, and the head device, and discharges liquid by driving the liquid discharge head. The liquid discharge apparatus may be, for example, an apparatus that can discharge liquid to a material to which liquid can adhere, or an apparatus that discharges liquid toward gas or into liquid.

The liquid discharge apparatus may include devices that feed, convey, and eject the material to which liquid can adhere. The liquid discharge apparatus may further include a pretreatment apparatus and a post-treatment apparatus that coat, with a treatment liquid, the material onto which the liquid has been discharged.

The "liquid discharge apparatus" may be, for example, an image forming apparatus that forms an image on a sheet by discharging ink, or a three-dimensional fabrication apparatus that discharges a fabrication liquid to a powder layer in which powder material is formed in layers, to form a three-dimensional fabrication object.

The liquid discharge apparatus is not limited to an apparatus that discharges liquid to visualize meaningful images, such as letters or figures. For example, the liquid discharge apparatus may be an apparatus that forms meaningless images, such as meaningless patterns, or fabricates three-dimensional images.

The above-described term "material to which liquid can adhere" represents a material to which liquid at least temporarily adheres, a material to which liquid adheres and is fixed, or a material into which liquid permeates after adhering thereto. Examples of the "material to which liquid can adhere" include recording media, such as a paper sheet, recording paper, a recording sheet of paper, a film, and cloth, electronic components, such as an electronic substrate and a piezoelectric element, and media, such as a powder layer, an organ model, and a testing cell. The "material to which liquid can adhere" includes any material to which liquid can adhere, unless particularly limited.

Examples of the "material to which liquid can adhere" include any materials to which liquid can adhere even temporarily, such as paper, thread, fiber, fabric, leather, metal, plastic, glass, wood, and ceramics.

The "liquid discharge apparatus" may be an apparatus that causes relative movement of the liquid discharge head and a material to which liquid can adhere. However, the liquid discharge apparatus is not limited to such an apparatus. For example, the liquid discharge apparatus may be a serial head apparatus that moves the liquid discharge head, or may be a line head apparatus that does not move the liquid discharge head.

Examples of the "liquid discharge apparatus" also include a treatment solution application apparatus that discharges a treatment solution onto a sheet so as to apply the treatment solution to the surface of the sheet for the purpose of modifying the surface of the sheet. As another example of the "liquid discharge apparatus," there is also an injection granulation apparatus that jets a composition liquid in which a raw material is dispersed in a solution, through a nozzle to granulate fine particles of the raw material.

The terms "image formation," "recording," "printing," "image printing," and "fabricating" used herein may be used synonymously with each other.

The above-described embodiments are limited examples, and the present disclosure includes, for example, the following aspects having advantageous effects.

(Aspect 1)

The liquid discharge head 1 including: a substrate such as the channel substrate 100 having the pressure chamber 4 communicating with the nozzle 2; the diaphragm 103 formed as a layer on the substrate on a side where the substrate faces the nozzle, the diaphragm 103 forming part of a wall surface of the pressure chamber 4; and the piezoelectric element 5 mounted on a surface of the diaphragm 103 opposite to a surface forming the wall surface of the pressure chamber 4, the piezoelectric element 5 including a piezoelectric portion, such as the piezoelectric film 52, sandwiched between a pair of electrodes, wherein either one of the pair of electrodes of the piezoelectric element 5 is larger than the pressure chamber 4 as viewed from a liquid discharge direction.

In a nozzle vibration type liquid discharge head in which a diaphragm and a piezoelectric element are disposed on a nozzle side of a substrate, a pressure chamber having a high cross-sectional aspect ratio (narrow and deep pressure chamber) is desirable so as to ensure desired discharge characteristics. Deep reactive ion etching (DRIE) is suitable to form such a pressure chamber having a high cross-sectional aspect ratio. In DRIE, ions are accelerated by an electric field, and are caused to collide with a substrate to etch the substrate. However, in DRIE, there is a possibility that the charging of a surface etched by ions may bend released ions, so that so-called notching, bowing, or the like may occur. In the notching, a bottom surface-side end of a side wall surface of a recess formed as a result of being etched by ions is excessively etched. In the bowing, a side wall surface becomes bowed. As a result, there is a possibility that the pressure chamber may not be accurately formed by DRIE.

Therefore, in the present embodiment, the pressure chamber is formed by DRIE in a state where either one of the pair of electrodes of the piezoelectric element 5 is electrically connected to the ground as described above, so as to prevent the charging (charge-up) of the surface of the substrate etched by ions. Furthermore, in aspect 1, at least one of the pair of electrodes of the piezoelectric element is larger than the pressure chamber when viewed from the liquid discharge direction, so as to satisfactorily prevent the charging of the surface of the substrate etched by ions. As a result, the electrode larger than the pressure chamber can be electrically connected to the ground while the pressure chamber is being formed by DRIE. Thus, the charge of the substrate can more easily escape to the electrode than in a case where an electrode smaller than the pressure chamber is electrically connected to the ground. It is thus possible to satisfactorily prevent the charging of the surface etched by ions, to satisfactorily prevent notching and bowing, and to accurately form the pressure chamber.

(Aspect 2)

In aspect 1, an electrode of the piezoelectric element 5, such as the second electrode 53, located on a side opposite to a side facing the diaphragm 103 is larger than the pressure chamber 4 as viewed from the liquid discharge direction.

According to this aspect, in a state Where the electrode such as the second electrode 53 located on the side opposite to the side facing the diaphragm is electrically connected to the ground, the pressure chamber 4 is formed by DRIE, as described in the embodiment. As a result, it is possible to accurately -form the pressure chamber 4.

(Aspect 3)

In aspect 2, the piezoelectric portion such as the piezoelectric film 52 is covered with the electrode of the piezoelectric element 5, such as the second electrode 53, located on the side opposite to the side facing the diaphragm 103.

According to this aspect, the piezoelectric film 52 can be protected from moisture by the electrode such as the second electrode 53 located on the side opposite to the side facing the diaphragm, as described in the embodiment. As a result, it is not needed to provide a protective layer for protecting the piezoelectric portion from moisture. Therefore, the thickness of the actuator 110 can be reduced as compared with a case where a moisture-resistant protective layer is provided. As a result, the diaphragm 103 is easily deformed, so that vibration efficiency can be enhanced.

(Aspect 4)

In aspect 1, an electrode of the piezoelectric element 5, such as the first electrode 51, located on a side facing the diaphragm 103 is larger than the pressure chamber 4 as viewed from the liquid discharge direction.

According to this aspect, in a state where the electrode such as the first electrode 51 located on the side facing the diaphragm 103 is electrically connected to the ground, the pressure chamber 4 is formed by DRIE, as described in the embodiment. As a result, it is possible to accurately form the pressure chamber 4.

(Aspect 5)

In any one of aspects 1 to 4, the piezoelectric portion such as the piezoelectric film 52 is smaller than the pressure chamber 4 as viewed from the liquid discharge direction.

According to this aspect, as described in the embodiment, vibration efficiency and discharge efficiency can be more greatly enhanced than in a case where the piezoelectric portion such as the piezoelectric film 52 is larger than the pressure chamber 4.

(Aspect 6)

In any one of aspects 1 to 5, contact portions such as the first contact 7*a* and the second contact 7*b* are provided outside the pressure chamber 4, the contact portions electrically connecting the first electrode 51 and the second electrode 53 of the piezoelectric element 5 with wires such as the first lead-out wire 9*a* and the second lead-out wire 9*b*, respectively.

According to this aspect, as described in the embodiment, the contact portions such as the first contact 7*a* and the second contact 7*b* can be provided in a non-displaceable portion of the diaphragm 103. As a result, it is possible to prevent disconnection of the junction between the contact portions and the electrodes and the junction between the contact portions and the wires such as the first lead-out wire 9*a* and the second lead-out wire 9*b* due to displacement of the diaphragm 103.

(Aspect 7)

A liquid discharge device including: a liquid discharge head; and at least one of a head tank, a carriage, a supply unit, a maintenance unit, or a main scan moving unit, wherein the liquid discharge head according to any one of aspects 1 to 6 is used as the liquid discharge head.

This makes it possible to accurately form the pressure chamber.

(Aspect 8)

A liquid discharge apparatus including: the liquid discharge head according to any one of aspects 1 to 6, or the liquid discharge device according to aspect 7.

This makes it possible to accurately form the pressure chamber.

(Aspect 9)

A method for manufacturing a liquid discharge head, the method including: a step of forming, as a layer, a vibration member such as the diaphragm 103 on a substrate such as the channel substrate 100; a step of forming a piezoelectric element including a piezoelectric portion, such as the piezoelectric film 52, sandwiched between a pair of electrodes, the piezoelectric element being located on a side of the vibration member opposite to a side facing the substrate; a step of forming wires, such as the first lead-out wire 9*a* and the second lead-out wire 9*b*, to be used to drive the piezoelectric element 5; and a step of forming a pressure chamber 4 in the substrate in a state where either one of the pair of electrodes of the piezoelectric element 5 is electrically connected to the ground via the wire.

According to this aspect, it is possible to prevent the charge-up of the etching surface of the substrate such as the channel substrate 100, and prevent disturbance of an electric field in the vicinity of an etched region, as described in the embodiment. As a result, it is possible to prevent released ions from being bent, and prevent occurrence of notching and bowing. Therefore, the pressure chamber 4 can be accurately shaped, (Aspect 10)

In aspect 9, the pressure chamber 4 is formed in the substrate such as the channel substrate 100 by a DRIE process.

This makes it possible to form the pressure chamber 4 having a high cross-sectional aspect ratio (narrow and deep pressure chamber), as described in the embodiment.

According to the present embodiment, the pressure chamber can be accurately formed.

(Aspect 11)

A liquid discharge head includes: a nozzle from which a liquid is to be discharged; a pressure chamber communicating with the nozzle; a substrate defining a side wall the pressure chamber; a diaphragm having a surface on the substrate, the diaphragm defining a part of a wall of the pressure chamber and a part of the nozzle; and a piezoelectric element on another surface of the diaphragm opposite to the surface of the diaphragm on the substrate, the piezoelectric element including: a piezoelectric portion configured to vibrate; and a pair of electrodes sandwiching the piezoelectric portion between the pair of electrodes, and an area of at least one of the pair of electrodes of the piezoelectric element is larger than an area of the pressure chamber in a plane of the diaphragm.

(Aspect 12)

In the liquid discharge head according to aspect 11, the pair of electrodes includes: a first electrode on the diaphragm; and a second electrode farther than the first electrode (51) from the substrate, and an area of the second electrode is larger than the area of the pressure chamber in the plane of the diaphragm.

(Aspect 13)

In the liquid discharge head according to aspect 12, the pressure chamber and the piezoelectric element are circular in the plane of the diaphragm, and an outer diameter of the second electrode is larger than an inner diameter of the pressure chamber.

(Aspect 14)

In the liquid discharge head according to aspect 12, the pressure chamber and the piezoelectric element are circular in the plane of the diaphragm, and an outer diameter of the second electrode is larger than an outer diameter of the piezoelectric portion.

(Aspect 15)

In the liquid discharge head according to aspect 12, the second electrode covers the piezoelectric portion.

(Aspect 16)

In the liquid discharge head according to aspect 15, the second electrode covers entirely the first electrode and the piezoelectric portion.

(Aspect 17)

In the liquid discharge head according to aspect 12. an area of the first electrode is larger than the area of the pressure chamber in the plane of the diaphragm.

(Aspect 18)

In the liquid discharge head according to aspect 17, the pressure chamber and the piezoelectric element are circular in the plane of the diaphragm, and an outer diameter of the first electrode is larger than an inner diameter of the pressure chamber.

(Aspect 19)

In the liquid discharge head according to aspect 11, an area of the piezoelectric portion is smaller than the area of the pressure chamber in the plane of the diaphragm.

(Aspect 20)

In the liquid discharge head according to aspect 11, the pressure chamber and the piezoelectric element are circular in the plane of the diaphragm, and an outer diameter of the piezoelectric portion is smaller than an inner diameter of the pressure chamber in the plane of the diaphragm.

(Aspect 21)

In the liquid discharge head according to aspect 12, the pressure chamber has a quadrilateral shape in the plane of the diaphragm, and at least one of the piezoelectric portion, the first electrode, or the second electrode has a quadrilateral shape in the plane of the diaphragm.

(Aspect 22)

In the liquid discharge head according to aspect 12, further includes: a first wire; a second wire; a first contact adjacent to an outer end of the first electrode, the first contact electrically connecting the first electrode and the first wire; a second contact adjacent to an outer end of the second electrode, the second contact electrically connecting the second electrode and the second wire.

(Aspect 23)

In the liquid discharge head according to aspect 12, the first electrode and the second electrode are circular, and the first wire and the second wire are respectively drawn out at right angles to circumferential directions of the first electrode and the second electrode.

(Aspect 24)

In the liquid discharge head according to aspect 13, the piezoelectric element is circular, and the first wire and the second wire are disposed at an angle of 180 degrees to each other in a circumferential direction of the piezoelectric element.

(Aspect 25)

In the liquid discharge head according to aspect 13, further includes: a first extension wire extending outside the pressure chamber, the first extension wire connected to the first electrode; and a second extension wire extending outside the pressure chamber, the second extension wire connected to the second electrode, the first contact is in a first region of the first extension wire outside the pressure chamber, and the second contact is in a second region of the second extension wire outside the pressure chamber.

(Aspect 26)

A liquid discharge device includes: the liquid discharge head according to aspect 11; and at least one of a head tank configured to supply the liquid to the liquid discharge head, a carriage mounting the liquid discharge head, a supply unit configured to supply the liquid to the head tank, a maintenance unit configured to maintain the liquid discharge head, or a main scan moving unit configured to move the carriage in a main scanning direction.

(Aspect 27)

A liquid discharge apparatus includes: the liquid discharge head according to aspect 11, or the liquid discharge device according to aspect 26.

(Aspect 28)

A method for manufacturing a liquid discharge head, the method includes: forming a diaphragm on a substrate, one surface of the diaphragm is on the substrate; forming a piezoelectric element on another surface of the diaphragm, the piezoelectric element including a pair of electrodes and a piezoelectric portion between the pair of electrodes; forming wires to be electrically connected to the piezoelectric element; and forming a pressure chamber in the substrate while electrically connecting one of the pair of electrodes to a ground.

(Aspect 29)

In the method for manufacturing a liquid discharge head, according to aspect 18, the forming the pressure chamber uses a deep reactive ion etching process to form the pressure chamber in the substrate.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. A liquid discharge head comprising:

a nozzle from which a liquid is to be discharged;

a pressure chamber communicating with the nozzle;

a substrate defining a side wall the pressure chamber;

a diaphragm having a surface on the substrate, the diaphragm defining a part of a wall of the pressure chamber and a part of the nozzle; and a piezoelectric element on another surface of the diaphragm opposite to the surface of the diaphragm on the substrate, the piezoelectric element including:

a piezoelectric portion configured to vibrate; and a pair of electrodes sandwiching the piezoelectric portion between the pair of electrodes, and an area of at least one of the pair of electrodes of the piezoelectric element is larger than an area of the pressure chamber in a plane of the diaphragm, wherein:

the pair of electrodes includes:

a first electrode on the diaphragm; and a second electrode farther than the first electrode from the substrate, and an area of the second electrode is larger than the area of the pressure chamber in the plane of the diaphragm, the pressure chamber and the piezoelectric element are circular in the plane of the diaphragm, and an outer diameter of the second electrode is larger than an inner diameter of the pressure chamber.

2. The liquid discharge head according to claim 1, wherein the second electrode covers the piezoelectric portion.

3. The liquid discharge head according to claim 2, wherein the second electrode covers entirely the first electrode and the piezoelectric portion.

4. The liquid discharge head according to claim 1, wherein an area of the first electrode is larger than the area of the pressure chamber in the plane of the diaphragm.

5. The liquid discharge head according to claim 4, wherein:

the pressure chamber and the piezoelectric element are circular in the plane of the diaphragm, and an outer diameter of the first electrode is larger than an inner diameter of the pressure chamber.

6. The liquid discharge head according to claim 1, wherein an area of the piezoelectric portion is smaller than the area of the pressure chamber in the plane of the diaphragm.

7. The liquid discharge head according to claim 1, wherein:

the pressure chamber and the piezoelectric element are circular in the plane of the diaphragm, and an outer diameter of the piezoelectric portion is smaller than an inner diameter of the pressure chamber in the plane of the diaphragm.

8. The liquid discharge head according to claim 1, wherein:

the pressure chamber has a quadrilateral shape in the plane of the diaphragm, and at least one of the piezoelectric portion, the first electrode, or the second electrode has a quadrilateral shape in the plane of the diaphragm.

9. The liquid discharge head according to claim 1, further comprising:

a first wire;

a second wire;

a first contact adjacent to an outer end of the first electrode, the first contact electrically connecting the first electrode and the first wire;

a second contact adjacent to an outer end of the second electrode, the second contact electrically connecting the second electrode and the second wire.

10. The liquid discharge head according to claim 9, wherein:

the first electrode and the second electrode are circular, and the first wire and the second wire are respectively drawn out at right angles to circumferential directions of the first electrode and the second electrode.

11. The liquid discharge head according to claim 10, wherein:

the piezoelectric element is circular, and the first wire and the second wire are disposed at an angle of 180 degrees to each other in a circumferential direction of the piezoelectric element.

12. The liquid discharge head according to claim 10, further comprising:

a first extension wire extending outside the pressure chamber, the first extension wire connected to the first electrode; and a second extension wire extending outside the pressure chamber, the second extension wire connected to the second electrode, wherein:

the first contact is in a first region of the first extension wire outside the pressure chamber, and the second contact is in a second region of the second extension wire outside the pressure chamber.

13. A liquid discharge device comprising:

the liquid discharge head according to claim 1; and at least one of a head tank configured to supply the liquid to the liquid discharge head, a carriage mounting the liquid discharge head, a supply unit configured to supply the liquid to the head tank, a maintenance unit configured to maintain the liquid discharge head, or a main scan moving unit configured to move the carriage in a main scanning direction.

14. A liquid discharge apparatus comprising:

the liquid discharge device according to claim 13.

15. A liquid discharge apparatus comprising:

the liquid discharge head according to claim 1.

16. A liquid discharge head, comprising:

a nozzle from which a liquid is to be discharged;

a pressure chamber communicating with the nozzle;

a substrate defining a side wall the pressure chamber;

a diaphragm having a surface on the substrate, the diaphragm defining a part of a wall of the pressure chamber and a part of the nozzle; and a piezoelectric element on another surface of the diaphragm opposite to the surface of the diaphragm on the substrate, the piezoelectric element including:

a piezoelectric portion configured to vibrate; and a pair of electrodes sandwiching the piezoelectric portion between the pair of electrodes, and an area of at least one of the pair of electrodes of the piezoelectric element is larger than an area of the pressure chamber in a plane of the diaphragm, wherein:

the pair of electrodes includes:

a first electrode on the diaphragm; and a second electrode farther than the first electrode from the substrate, and an area of the second electrode is larger than the area of the pressure chamber in the plane of the diaphragm, the pressure chamber and the piezoelectric element are circular in the plane of the diaphragm, and an outer diameter of the second electrode is larger than an outer diameter of the piezoelectric portion.

17. A method for manufacturing a liquid discharge head, the method comprising:

forming a diaphragm on a substrate, one surface of the diaphragm is on the substrate;

forming a piezoelectric element on another surface of the diaphragm, the piezoelectric element including a pair of electrodes and a piezoelectric portion between the pair of electrodes;

forming wires to be electrically connected to the piezoelectric element; and forming a pressure chamber in the substrate while electrically connecting one of the pair of electrodes to a ground, wherein:

the pair of electrodes includes:

a first electrode on the diaphragm; and a second electrode farther than the first electrode from the substrate, and an area of the second electrode is larger than the area of the pressure chamber in the plane of the diaphragm, the pressure chamber and the piezoelectric element are circular in the plane of the diaphragm, and an outer diameter of the second electrode is larger than an inner diameter of the pressure chamber.

18. The method for manufacturing a liquid discharge head, according to claim 17, wherein the forming the pressure chamber uses a deep reactive ion etching process to form the pressure chamber in the substrate.

* * * * *